United States Patent
Endoh

(10) Patent No.: US 7,893,920 B2
(45) Date of Patent: Feb. 22, 2011

(54) OPERATION INPUT DEVICE AND METHOD OF OPERATION INPUT

(75) Inventor: Kenjiro Endoh, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 830 days.

(21) Appl. No.: 11/104,872

(22) Filed: Apr. 13, 2005

(65) Prior Publication Data

US 2005/0248529 A1 Nov. 10, 2005

(30) Foreign Application Priority Data

May 6, 2004 (JP) .............................. 2004-137384
May 6, 2004 (JP) .............................. 2004-137385

(51) Int. Cl.
    *G09G 5/00* (2006.01)
(52) U.S. Cl. ........................ 345/156; 345/173; 345/175
(58) Field of Classification Search ......... 345/156–158, 345/159, 173, 175
    See application file for complete search history.

(56) References Cited

U.S. PATENT DOCUMENTS

| | | | | |
|---|---|---|---|---|
| 5,864,334 A * | 1/1999 | Sellers | ...................... | 345/168 |
| 6,353,428 B1 * | 3/2002 | Maggioni et al. | .......... | 345/157 |
| 6,434,255 B1 | 8/2002 | Harakawa | | |
| 6,454,419 B2 * | 9/2002 | Kitazawa | ..................... | 353/122 |
| 6,531,999 B1 * | 3/2003 | Trajkovic | .................... | 345/157 |
| 6,598,978 B2 * | 7/2003 | Hasegawa | ..................... | 353/42 |
| 6,600,475 B2 * | 7/2003 | Gutta et al. | .................. | 345/156 |
| 2003/0151592 A1 * | 8/2003 | Ritter | .......................... | 345/156 |
| 2004/0183775 A1 * | 9/2004 | Bell | ........................... | 345/156 |
| 2004/0217267 A1 | 11/2004 | Reime | | |
| 2006/0168523 A1 * | 7/2006 | Yoda et al. | .................. | 715/728 |

FOREIGN PATENT DOCUMENTS

| | | |
|---|---|---|
| JP | 61-196317 | 8/1986 |
| JP | 05-019957 | 1/1993 |
| JP | H10-154037 | 6/1998 |
| JP | H11-064026 | 3/1999 |
| JP | 11-134089 | 5/1999 |
| JP | 2002-259989 | 9/2002 |

* cited by examiner

*Primary Examiner*—Amr Awad
*Assistant Examiner*—Michael Pervan
(74) *Attorney, Agent, or Firm*—Brinks Hofer Gilson & Lione

(57) ABSTRACT

A three-dimensional image sensor for detecting the three-dimensional position of an object, a coordinate detection unit for detecting the coordinate position of an objective point on a display screen based on the position of the object in a virtual pointing space, a movement detection unit for detecting the three-dimensional movement of the object in the pointing space, and an operation input contents determination unit for determining an operation based on the three-dimensional movement or the like of the object are provided, so that the inconvenience of moving a pointing device such as a finger to a fixed spatial plane is avoided by setting the pointing space which can be operated by the pointing device as a pyramid shape defined by connecting the display screen and a reference point.

22 Claims, 18 Drawing Sheets

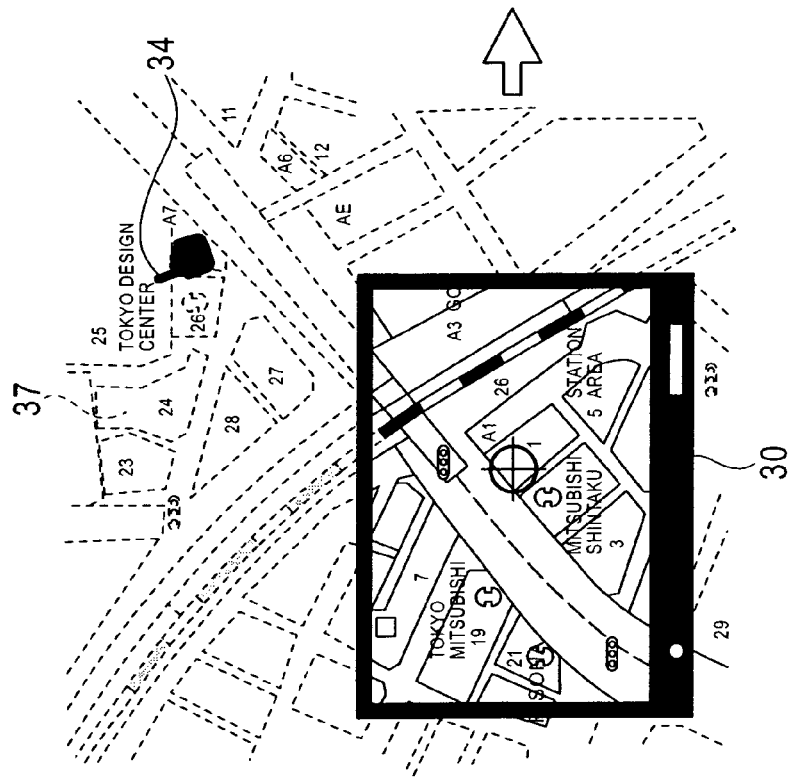

OPERATION INPUT DEVICE AND METHOD OF OPERATION INPUT

BACKGROUND

1. Field of the Invention

The present invention relates to an operation input device and a method of operation input, and is suitable specifically for an operation input device for issuing instructions to a computer system or a navigation system through the input operation by an operator.

2. Description of the Related Art

In the related art, a wide variety of operation input devices are employed for issuing instructions to a computer system or a navigation system through the input operation by an operator, such as a remote controller including a keyboard, mouse, trackball or joystick, or a touch panel. All these operation input devices are contact-type input devices which are operated by actually being touched by an operator, and require troublesome work.

For example, when the operator activates application software on a computer system to work thereon, the operator must use the keyboard for character input or the like and use the mouse or the trackball for specifying positions, and such utilization of different devices for different operations is quite inconvenient. In addition, in order to operate a vehicle-mounted navigation system, the driver must stop the vehicle for safety, release his/her hands from the steering wheel, and operate the joystick of the remote controller or the touch panel each time, which is quite troublesome.

In order to cope with this problem, a non-contact type technology has been developed in which the input operation is executed by detection of movement of a finger in a space (for example, see Japanese Unexamined Patent Application Publication No. 8-202480). According to the technology described in Japanese Unexamined Patent Application Publication No. 8-202480, a predetermined space corresponding to a display screen is scanned by an infrared ray, and the fact that the infrared ray is irradiated on a pointing device such as a finger which enters the space is detected by an infrared ray sensor. Then, the position in the space specified by the pointing device is obtained from the position of irradiation of the infrared ray at that time, the position on the display screen corresponding to the position in the space is determined, and an operation instruction predetermined for the specified position is provided.

However, according to the technology described in the above-described patent document, the position in space for the operation input is limited to a plane scanned by the infrared ray, and hence the pointing device such as a finger must be moved to the above-described spatial plane each time. In particular, the space in which the operation input is enabled is constantly fixed at a predetermined space corresponding to the display screen even though the operator is not necessarily at the same position with respect to the display screen. Therefore, the operator must move the pointing device such as a finger to the predetermined spatial plane irrespective of the position of the operator, and hence this device is very user-unfriendly.

The operation input device is not necessarily used by a single specific person, but may be used by another operator having a different physical constitution. However, in the technology described in the patent document, the spatial plane in which the operation input is enabled is fixed at a predetermined position as described above. Yet, the range which the operator can reach depends on the physical constitution and hence there arises a problem that an operator having a smaller body may have a difficulty to execute the input operation depending on the position of the spatial plane. There is also a problem such that since the spatial plane is determined to have an absolute positional relation with respect to the display screen, the angle with respect to the spatial plane may vary with the position of the operator, and hence errors may occur in the operation input.

There is another problem in the technology described in the above-described patent document in that there is no way to differentiate the movement of the pointing device between a movement corresponding to the operation input and other movements. Hence, every time when the pointing device enters the spatial plane, it is determined to be the operation input, whereby erroneous operation input against the user's intension might be executed.

Also, the contact-type and non-contact type operation input devices described above both can execute the operation input only for an object displayed on the display screen, and an object which is assumed to be outside the display screen cannot be operated directly.

For example, in the case of a navigation system, a map displayed on the display screen is only a small part of the entire map, and there exists part of map continuing therefrom. Even though information which is assumed to be outside the display screen can be imagined easily from information displayed in the display screen as such map information, if a point, the position of which can be estimated, is located outside the screen, the point cannot be operated directly in the related art. Therefore, the operator must perform a very troublesome operation, that is, repeat a scrolling operation until the estimated point is displayed on the screen.

As a method of inputting a command in the computer system or the navigation system, a method of indicating an indicating or pointing area shown in the display screen in the shape of a button is widely employed. For example, in the case of the touch panel, the operator inputs a command by touching the indicating area in the shape of a button displayed in the display screen.

However, when the size of the indicating area is increased, the area which displays main content information such as the map or movie is decreased, whereby the content information cannot be seen optimally. In contrast, when the size of the indicating area is reduced in order to avoid the above-described problem, accuracy of an indicating action done by the finger or the like is required, which causes a problem that the operability is degraded. Such a problem becomes obvious when the size of the display screen is not large, such as in the navigation system.

SUMMARY OF THE INVENTION

In order to solve the above-described problems, an object of the invention is to eliminate the necessity to move a pointing device such as a finger to a predetermined fixed space, thereby improving usability.

It is another object of the invention to enable the operator to perform operation input normally from any position irrespective of the position of the operator.

It is still another object of the invention to reduce the possibility of occurrence of error irrespective of the position of the operator and of the position where the operation is executed.

It is further object of the invention to avoid a disadvantage that the operation input is executed against the intention of the user.

In view of such circumstances, it is also an object of the invention to enable the operator to execute the input operation directly for a point or an object which is assumed to exist outside the display screen.

It is another object of the invention to facilitate the operation input without reducing the size of an indicating area while securing a sufficient area for displaying main content information.

In order to achieve the above-described objects, the invention is configured to detect the three-dimensional position of an object, detect the three-dimensional movement of the object within a virtual pointing space defined by connecting the display screen and a predetermined reference point, calculating a coordinate of the objective point on the display screen, which is obtained by mapping a position where the object in the pointing space exists on the display screen, and determining the contents of the operation input based on the coordinate of the objective point on the display screen corresponding to the three-dimensional movement of the object and the position of the object.

It is also possible to recognize that the object in the pointing space is a predetermined pointing device, and detect the three-dimensional movement of the pointing device or the coordinate of the objective point on the display screen based on the detected position of the object, which is recognized as the pointing device, in the pointing space.

The above-described pointing space is a virtual space of pyramid shape defined by connecting the display screen and the predetermined reference point located at a position apart from the display screen, and preferably the predetermined reference point is set, for example, to the position of the operator's eye. The predetermined reference point may be set to a position which corresponds to an apex of a pyramid having both of the display screen and the plane obtained by connecting the positions of the object when pointing to four corners of the display screen in a space as cross-sections as an initial value, and be adapted to move in association with the movement of the operator. It is also possible to fix the reference point at the initial value when it is assumed that the movement of the operator is small.

An extended plane of a certain constant size is assumed outside the display screen and a deployed plane which is a combination of the display screen and the extended plane is set. Then, the pointing movement executed for the deployed plane is detected so as to output a corresponding operation instruction.

According to the present invention configured as described above, since the pointing space which can be operated by the pointing device such as a finger is set to a pyramid shape defined by connecting the display screen and the reference point, it is no longer necessary to execute the operation by moving the pointing device such as a finger to the spatial plane fixed into a planar state each time. When the pointing device is located in the pointing space, the pointing device may be at any position between the display screen and the operator, and thus the operator can execute the operation input normally within the range the operator can reach. Accordingly, the usability of the operation input device by a human interface in the space can be improved.

According to the present invention, since the coordinate position on the display screen can be obtained by mapping the position where the pointing device exists, the disadvantage that erroneous input may occur can be minimized irrespective of the position of the operator with respect to the display screen.

According to the present invention, since the predetermined pointing device is recognized from among objects detected within the pointing space and the determination of the content of the operation input is only directed to the pointing device, even when an object other than the pointing device moves within the pointing space, it is not determined as the operation input. Since it is determined that the operating input is executed only when the pointing device is moved in a predetermined fashion, the movement of the pointing device corresponding to the operation input and other movements can be differentiated. Therefore, even when the pointing device is moved accidentally within the pointing space, it is not determined as an operation input as long as it is unintended movement. Consequently, the disadvantage that an erroneous input is executed against the user's intention is prevented.

When the position of the operator's eye is set as the predetermined reference point which defines the pointing space, when the operator moves, the pointing space moves with the position of the moved operator's eye. Accordingly, the troublesome work of moving the pointing device such as a finger to the fixed spatial plane as in the related art is not necessary irrespective of the movement of the operator with respect to the display screen, and hence the operator can execute the operation input normally, so that the usability of the human interface in the space can further be improved.

When the position which corresponds to the apex of a pyramid containing both of the display screen and the plane obtained by connecting the positions of the object when indicating the four corners of the display screen in space as a cross-section is set as the predetermined reference point for defining the pointing space, the position of the pointing device when the operator anticipates the display screen and indicates the position on the display screen normally is always contained in the pointing space. Accordingly, the operation input can be executed in a more natural form, and hence the usability of the human interface in the space can further be improved.

Since the indicating action is applied not only to the area within the display screen, but also to the extended plane assumed on the outside of the display screen, the operation input can be executed directly for a point or an object which is assumed to be outside the display screen.

By dividing a part of or the entire extended plane into one or more areas, setting the respective areas as pointing areas, and assigning "command execution" or the like to the respective pointing areas, most of the inside of the display screen can be used for displaying main content information and the extended plane assumed outside the display screen can be used as the pointing area for executing commands. Accordingly, the operation input is facilitated without reducing the pointing area while securing a sufficient area for displaying the main content information.

BRIEF DESCRIPTION OF THE DRAWINGS

FIG. 15 is a drawing showing an example of an action when the drag operation is performed;

DESCRIPTION OF THE PREFERRED EMBODIMENTS

First Embodiment

Figure 1:
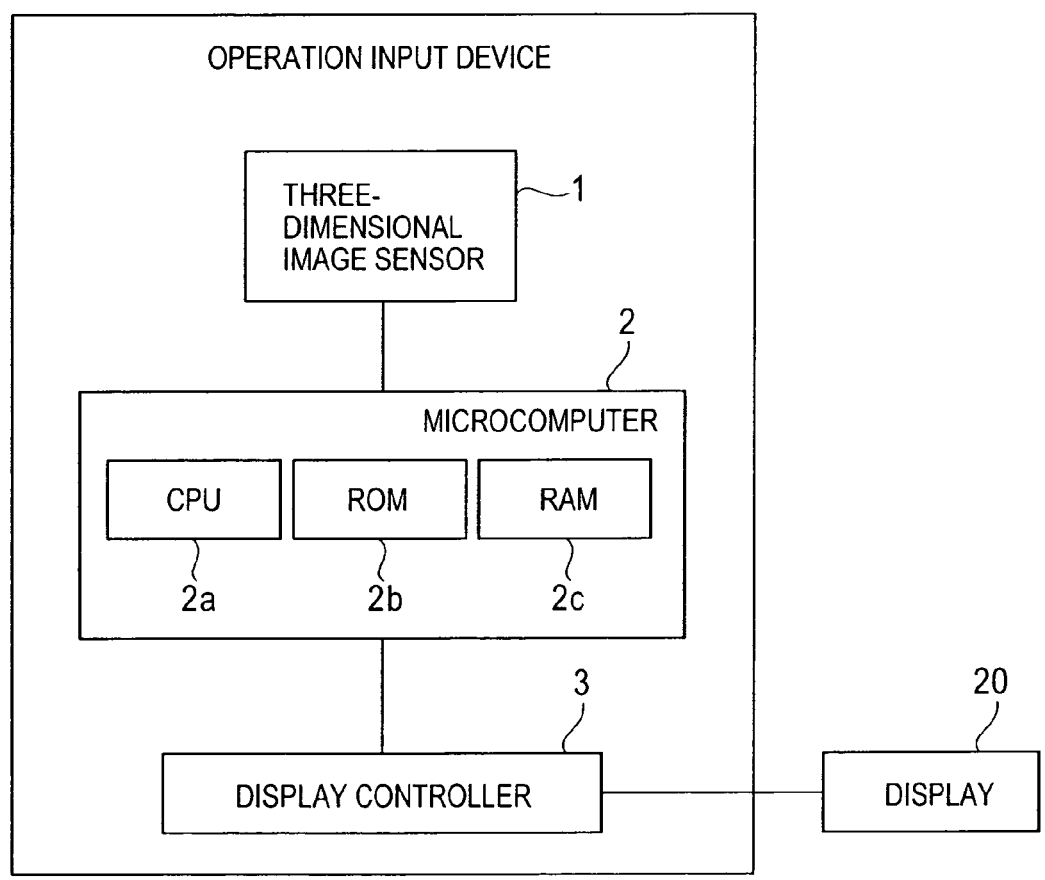
FIG. 1 is a drawing showing an example of a structure of an operation input device according to a first embodiment.

Referring now to the drawings, an embodiment of the present invention will be described. FIG. 1 is a drawing showing an example of a structure of an operation input device according to a first embodiment. As shown in FIG. 1, the operation input device according to the first embodiment includes a three-dimensional image sensor 1 as a position detecting means, a microcomputer 2 including a CPU 2a, a ROM 2b and a RAM 2c, and a display controller 3 as a display controlling means for controlling the display of a display 20.

The three-dimensional image sensor 1 is for detecting a three-dimensional position of an object in a space. For example, the distance to the object (the relative position of the object) is detected by irradiating a beam to the object and measuring the beam which is reflected back therefrom. For the three-dimensional image sensor 1, for example, a known technology which is disclosed in U.S. Pat. No. 6,515,740 may be applied. With the technology described in this U.S. patent document, the three-dimensional image sensor 1 can detect not only the three-dimensional relative position of the object with respect to the installed position, but also the three-dimensional shape of the object. In other words, when the object has projections and depressions and there exists differences in distance from the three-dimensional image sensor 1 to the surface of the object, the three-dimensional shape of the object can be detected by generating positional information according to the differences in distance.

The CPU 2a provided on the microcomputer 2 controls the entire operation input device. The ROM 2b stores various programs required for the operation of the operation input device. The RAM 2c temporarily stores data obtained in the course of various processes or data obtained as a result of the various processes by the CPU 2a. In other words, the CPU 2a controls the operation of the operation input device according to the various programs stored in the ROM 2b while using the RAM 2c as a work memory.

Figure 2:
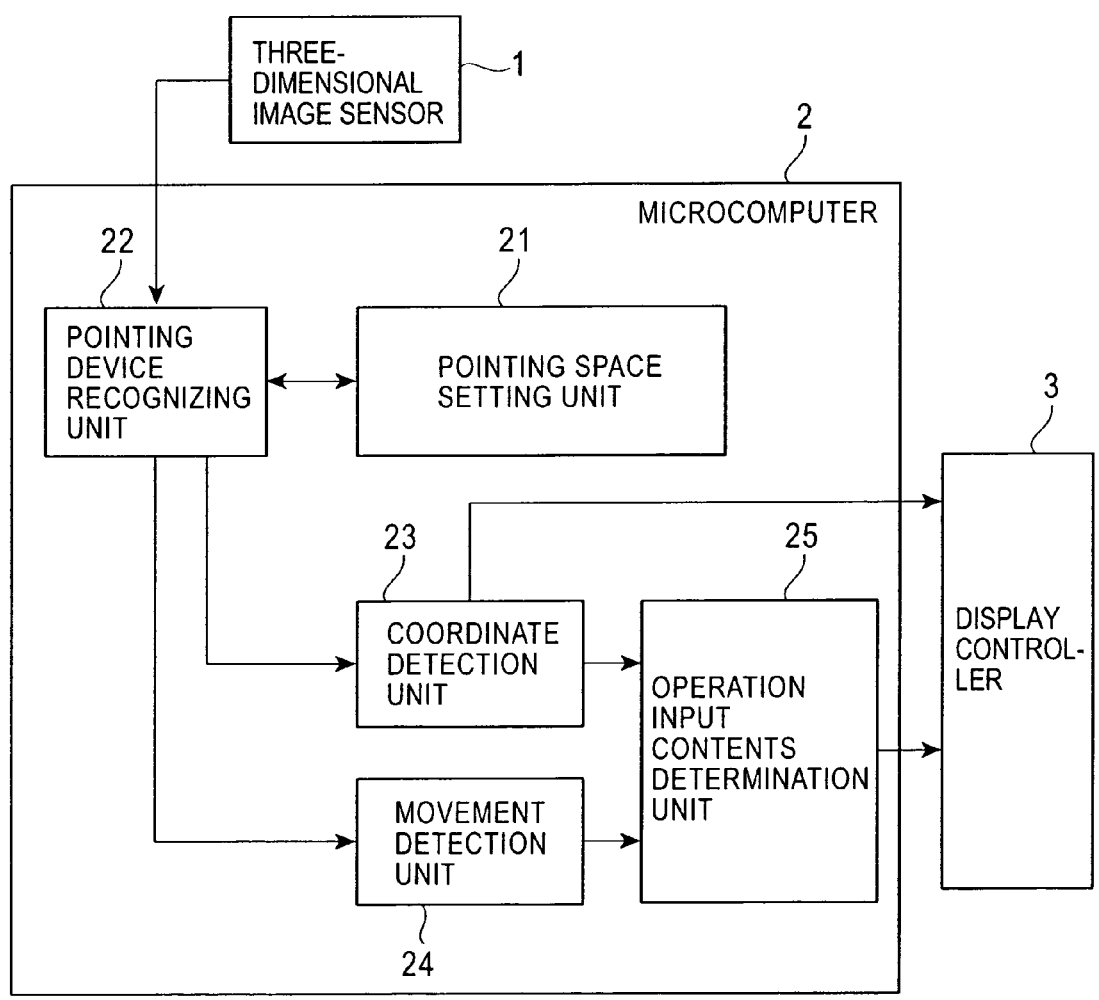
FIG. 2 is a block diagram showing a functional structure of a microcomputer according to the first embodiment.
Figure 3A:
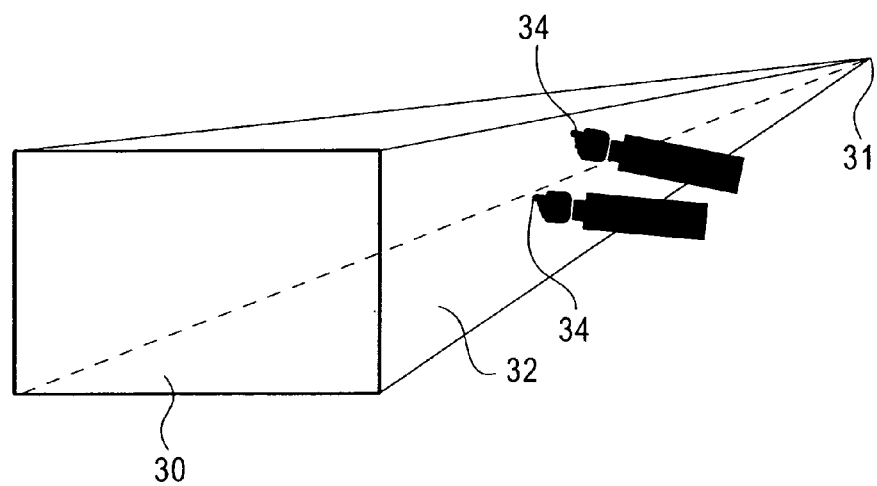
FIG. 3 is a conceptual drawing for explaining a pointing space in the first embodiment.
Figure 3B:
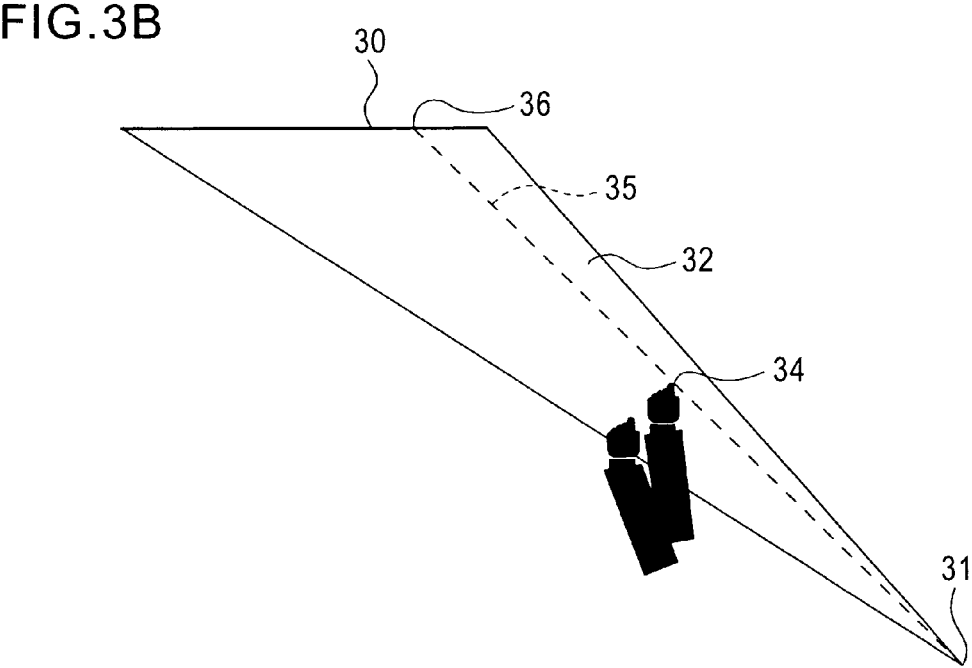

FIG. 2 is a block diagram showing a functional structure of the microcomputer 2. FIG. 3 is a conceptual drawing for explaining the pointing space in this embodiment. As shown in FIG. 2, the microcomputer 2 in this embodiment includes a pointing space setting unit 21, a pointing device recognizing unit 22, a coordinate detection unit 23, a movement detection unit 24, and an operation input contents determination unit 25 as functional structures.

The pointing space setting unit 21, as shown in FIG. 3, sets a virtual pointing space 32 of pyramid shape defined by connecting a screen of the display 20 (hereinafter, referred to as display screen 30) and a predetermined reference point 31 which is located at a position spaced apart from the display screen 30.

The reference point 31 is set to a position where the operator is expected to be in many cases. For example, when the operation input device of the present embodiment is applied to a vehicle-mounted navigation system, preferably, the reference point 31 is set to a point in space in front of the headrest of a driver's seat where it is assumed to be the position of the driver's eye. FIG. 3 shows such a state. In other words, in the case of the vehicle-mounted navigation system, since the display screen 30 is installed substantially at the center of an instrument panel and the driver's seat is located on the right side (or the left side), the pointing space 32 is defined as an inclined pyramid shape as shown in FIG. 3.

In this case, since the position of the display screen 30 and the position of the reference point 31 are known in advance (for example, stored in the RAM 2c or other memories not shown), the pointing space 32 is uniquely determined.

The pointing device recognizing unit 22 detects the object existing in the pointing space 32 by the three-dimensional image sensor 1 and recognizes that it is a predetermined pointing device 34. In this embodiment, the pointing device 34 is assumed to be a rod-shaped projecting member. For example, a hand holding one finger up, or a writing tool or a pointing tool held by the operator corresponds to the pointing device 34.

When the three-dimensional image sensor 1 is installed near the display screen 30, the pointing device 34 is operated toward the display screen 30, that is, toward the three-dimensional image sensor 1. At this time, the three-dimensional image sensor 1 generates the positional information according to the distance to the object as described above. When the rod-shaped object is pointed toward the direction of the three-dimensional image sensor 1, closer positional information is generated only for the distal end portion of the rod-shaped object. Therefore, it is possible to detect the portion which is generating the closer positional information as the position where the pointing device 34 exists.

When the three-dimensional image sensor 1 is installed on the side of the pointing space 32 between the display screen 30 and the reference point 31, the pointing device 34 is operated in the lateral direction when viewed from the three-dimensional image sensor 1. As described above, the three-dimensional image sensor 1 can generate the positional information according to the three-dimensional shape of the object. Therefore, the pointing device recognizing unit 22 can determine whether or not an object longer than a predetermined length and thinner than a predetermined thickness exists in the pointing space 32, and if so, can recognize that it is the pointing device 34.

The coordinate detection unit 23 detects the coordinate position of an objective point 36 in the pointing space 32 detected by the three-dimensional image sensor 1 using a mapping relation. In other words, the coordinate detection unit 23 calculates the coordinate position of the objective point 36 where a line 35 passing through the position of the reference point 31 and the position of the pointing device 34 intersects with the display screen 30 from the position of the pointing device 34 recognized and detected in the pointing space 32. Although the position of the pointing device 34 detected by the three-dimensional image sensor 1 is a relative position viewed from the three dimensional image sensor 1, since the position of the three-dimensional image sensor 1 itself is known in advance, the absolute position of the pointing device 34 can be detected.

The coordinate detection unit 23 provides the coordinate information of the detected objective point 36 to a display controller 3. The display controller 3 displays a predetermined mark (for example, an arrow mark) at the coordinate position of the objective point 36 on the display screen 30 as needed.

The movement detection unit 24 detects the three-dimensional movement of the pointing device 34 in the pointing space 32. As described above, the three-dimensional image sensor 1 generates the three-dimensional positional information of the object in the pointing space 32 as needed, and whether or not the object is the pointing device 34 is detected by the pointing device recognizing unit 22. Therefore, the three-dimensional movement of the pointing device 34 can be detected by the change of the positional information relating to the pointing device 34.

The operation input contents determination unit 25 determines the contents of the operation input by the pointing device 34 executed by the operator based on the coordinate position of the objective point 36 on the display screen 30 detected by the coordinate detection unit 23 and the three-dimensional movement of the pointing device 34 detected by the movement detection unit 24, and generates the corresponding operation instruction.

Figure 4:
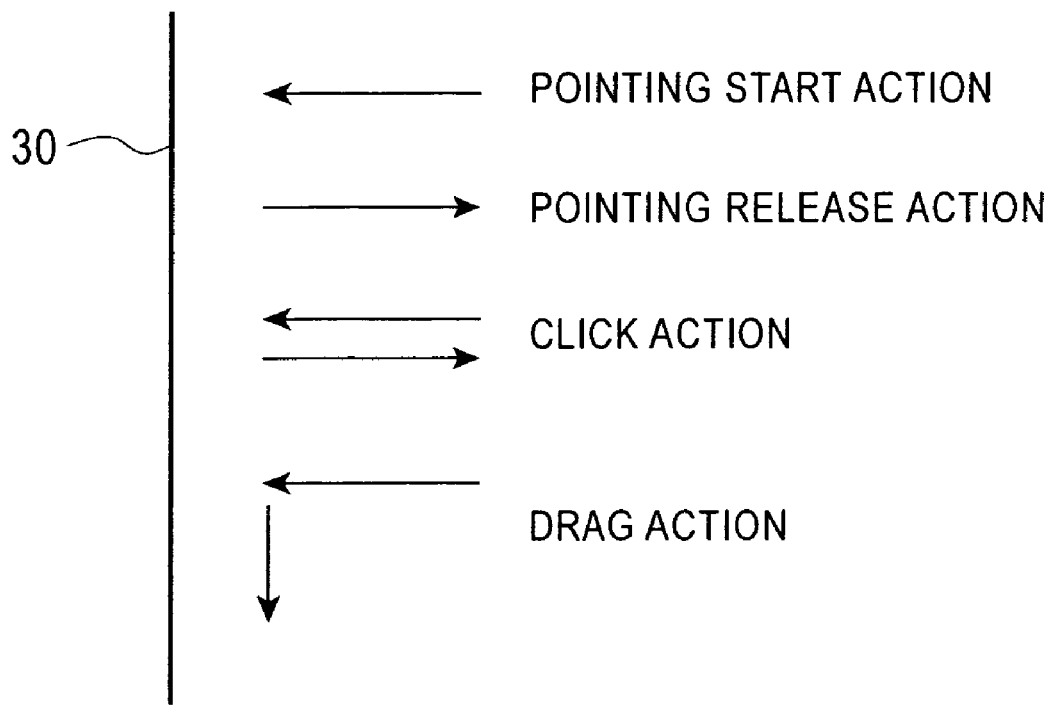
FIG. 4 is a drawing for explaining the contents of a pointing action according to first through fourth embodiments.

For example, as shown in FIG. 4, when the pointing device 34 is moved toward the display screen 30 at a speed faster than a predetermined speed within a predetermined coordinate range of the display screen 30 in the pointing space 32, the operation input contents determination unit 25 determines that the pointing start action is executed. When the pointing device 34 moves away from the display screen 30 at a speed faster than the predetermined speed within the predetermined coordinate range of the display screen 30, it is determined that the pointing release action is executed.

When the pointing device 34 performs the above-described pointing start action and then performs the pointing release action within a predetermined time period in the pointing space 32, it is determined that a click action is performed. In contrast, when the pointing device 34 performs the above-described pointing start action and then moves to cause the coordinate position of the objective point 36 on the display screen 30 detected by the coordinate detection unit 23 to move without performing the pointing release action, it is determined that a drag action is performed, and the amount of the movement of the coordinate position on the display screen 30 is detected as the drag amount.

The operation input contents determination unit 25 supplies information indicating the contents of the detected operation input to the display controller 3. The display controller 3 controls the display on the display screen 30 based on the information supplied from the operation input contents determination unit 25. For example, when it is determined that the drag action is performed by the operation input contents determination unit 25, the operation input contents determination unit 25 controls the display so that the object at the coordinate position of the objective point 36 (the position where the arrow mark exists) on the display screen 30 detected by the coordinate detection unit 23 is moved in the dragged direction by the dragged amount.

Figure 5:
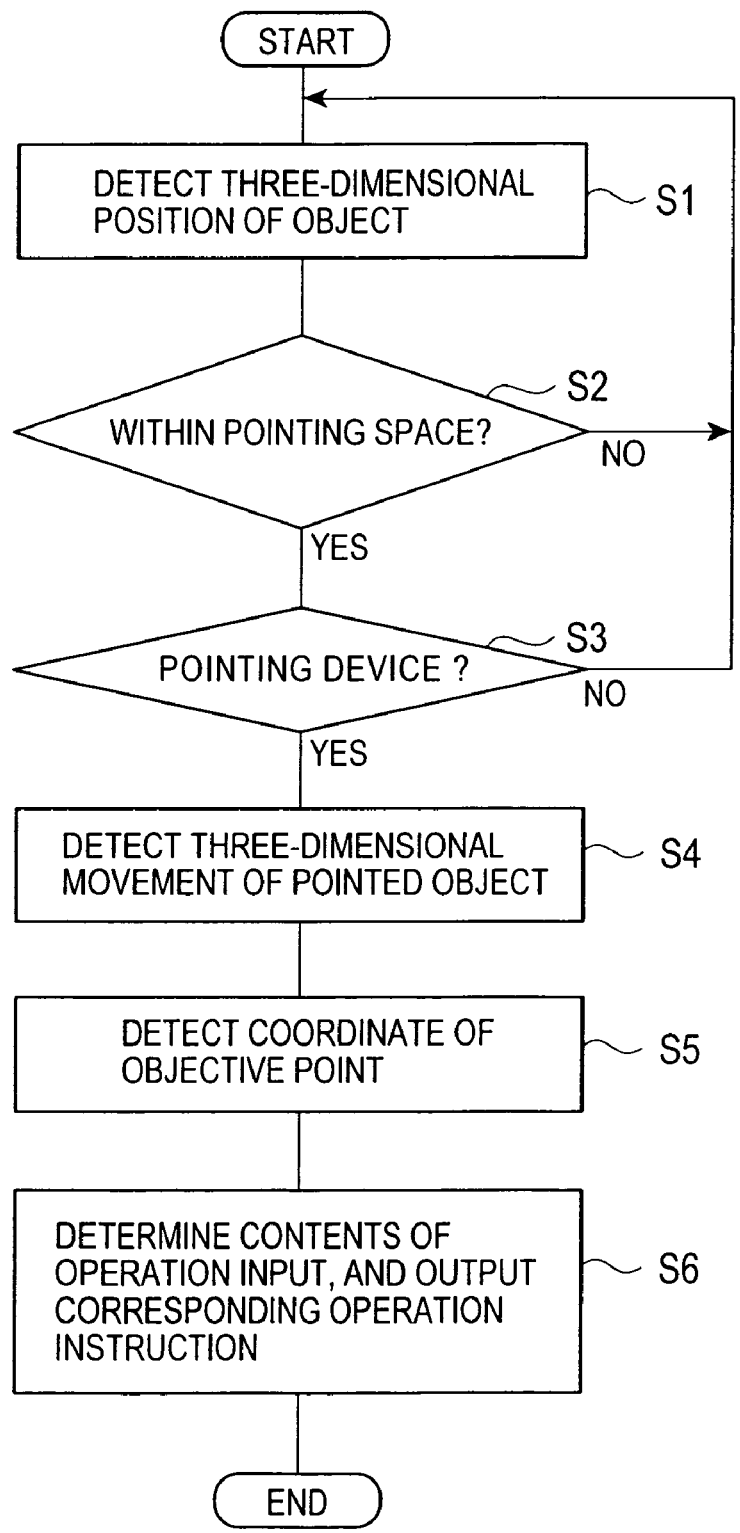
FIG. 5 is a flowchart showing the processing of the operation input device according to the first through fourth embodiments.

The operation of the operation input device according to the present embodiment configured as described above will now be described. FIG. 5 is a flowchart showing the operation of the operation input device according to the present embodiment. In FIG. 5, the three-dimensional image sensor 1 detects the three-dimensional position of the object in the space (Step S1), and then the pointing device recognizing unit 22 determines whether or not the object is within the pointing space 32 (Step S2). When the object is within the pointing space 32, the pointing device recognizing unit 22 further determines whether or not the object is the pointing device 34 (Step S3). When the object is not within the pointing space 32, or when the object is within the pointing space 32 but is not the pointing device 34, the procedure goes back to the process of Step S1.

When the pointing device recognizing unit 22 recognizes the pointing device 34 within the pointing space 32, the movement detection unit 24 detects the three-dimensional movement of the pointing device 34 within the pointing space 32 (Step S4). Based on the position of the pointing device 34 in the pointing space 32 detected by the three-dimensional image sensor 1, the coordinate detection unit 23 detects the coordinate position of the objective point 36 on the display screen 30 using the mapping relation (Step S5). The order of Step S4 and Step S5 may be inverted.

Finally, the operation input contents determination unit 25 determines the contents of the operation input based on the three-dimensional movement of the pointing device 34 detected by the movement detection unit 24 and the coordinate position of the objective point 36 on the display screen 30 corresponding to the position of the pointing device 34 detected by the coordinate detection unit 23, and generates the operating instruction corresponding to the operation (Step S6). In other words, the click action or the drag action is determined depending on whether or not a predetermined movement is performed, and the operation instruction corresponding to the determined action is generated.

For example, when the operation input contents determination unit 25 determines that the click action is performed toward the object (for example, the operating button by Graphical User Interface) existing at the coordinate position of the objective point 36, it generates the operation instruction for performing the process assigned to the operating button. When the operation input contents determination unit 25 determines that the drag action is performed for the object (an icon, for example) existing at the coordinate position of the objective point 36, it supplies the operation instruction for moving the object in the dragged direction by the dragged amount to the display controller 3. When the operation input device in this embodiment is applied to the navigation system, it is also possible to adapt the operation input device to generate the operation instruction for scrolling the entire map and moving the point indicated by the pointing start action in the dragged direction by the dragged amount.

As described in detail thus far, according to this embodiment, the pointing device 34 such as a finger in the space is not required to be detected at a position fixed into a planar state as in the related art, but is detected within the pyramid shaped pointing space 32, and the contents of the operation is determined by the position and the movement thereof. Accordingly, the operator need not perform the troublesome operation of moving the pointing device 34 such as a finger to the spatial plane fixed into a planar state each time, and can execute the operation input at a desired position as long as it is within the pointing space 32.

According to this embodiment, the coordinate position of the objective point 36 on the display screen 30 can be obtained by mapping the position where the pointing device 34 exists, and hence the disadvantage that an erroneous operation input may occur can be minimized irrespective of the position of the operator with respect to the display screen 30.

Also, according to this embodiment, since the determination of the contents of the operation input is executed only for the object which is recognized as a predetermined pointing device 34, even when an object other than the pointing device 34 is moved within the pointing space 32, it is not determined that the operation input is effected. Since the movement of the pointing device 34 corresponding to the contents of the operation input is limited, the movement of the pointing device corresponding to the operation input and other movements are differentiated. Therefore, even when the pointing device 34 is moved accidentally within the pointing space 32, it is not determined as the operation input as long as it is unintended movement. Consequently, the disadvantage that an erroneous operation input is executed against the user's intention is prevented.

Second Embodiment

Figure 6:
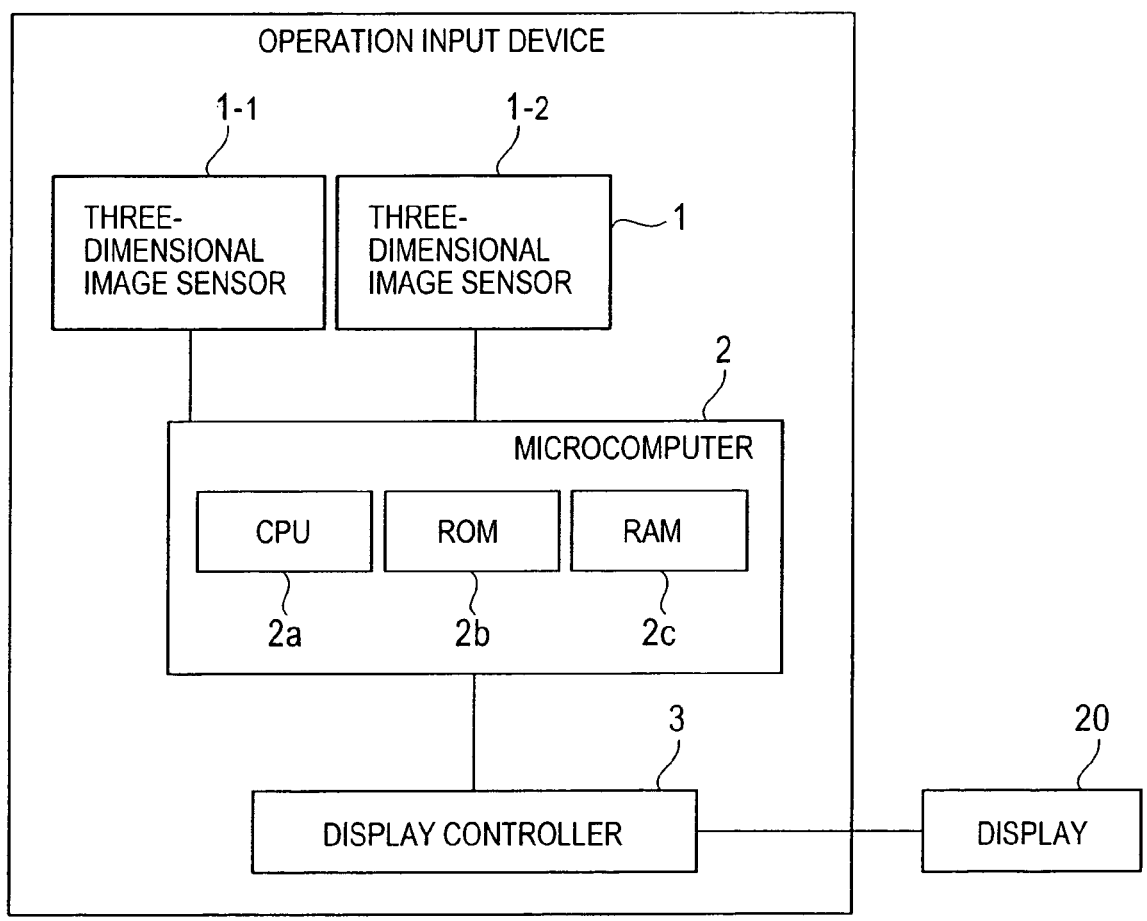
FIG. 6 is a drawing showing an example of the structure of the operation input device according to the second embodiment.

A second embodiment of the invention will now be described. FIG. 6 is a drawing showing an example of the structure of the operation input device according to the second embodiment. In FIG. 6, components represented by the same reference numerals have the same functions, and redundant description will be omitted.

As shown in FIG. 6, the operation input device according to the second embodiment includes two three-dimensional image sensors 1-1, and 1-2. The three-dimensional image sensor 1-1 is used for detecting the three-dimensional position of the pointing device 34 in the pointing space 32 as in the first embodiment. The other three-dimensional image sensor 1-2 is used for detecting the three-dimensional position of the operator's eye.

Figure 7A:
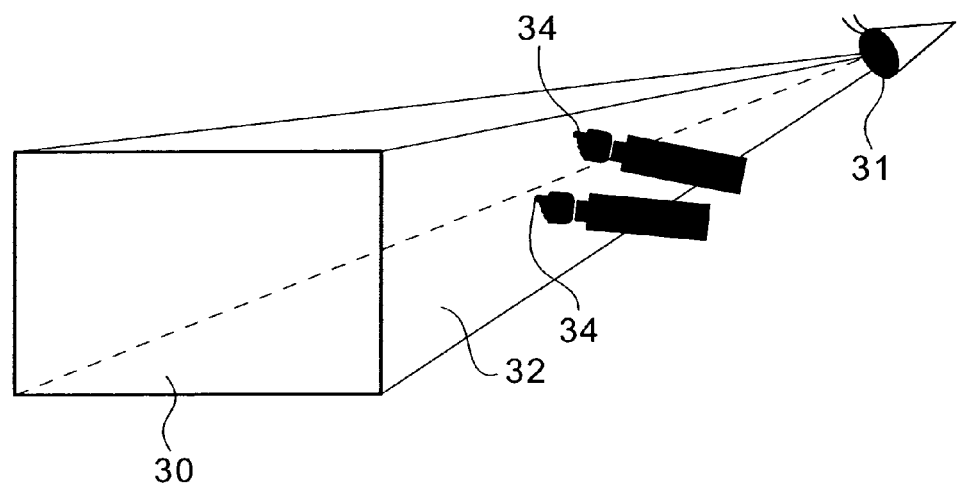
FIG. 7 is a conceptual drawing for explaining the pointing space according to the second embodiment.
Figure 7B:
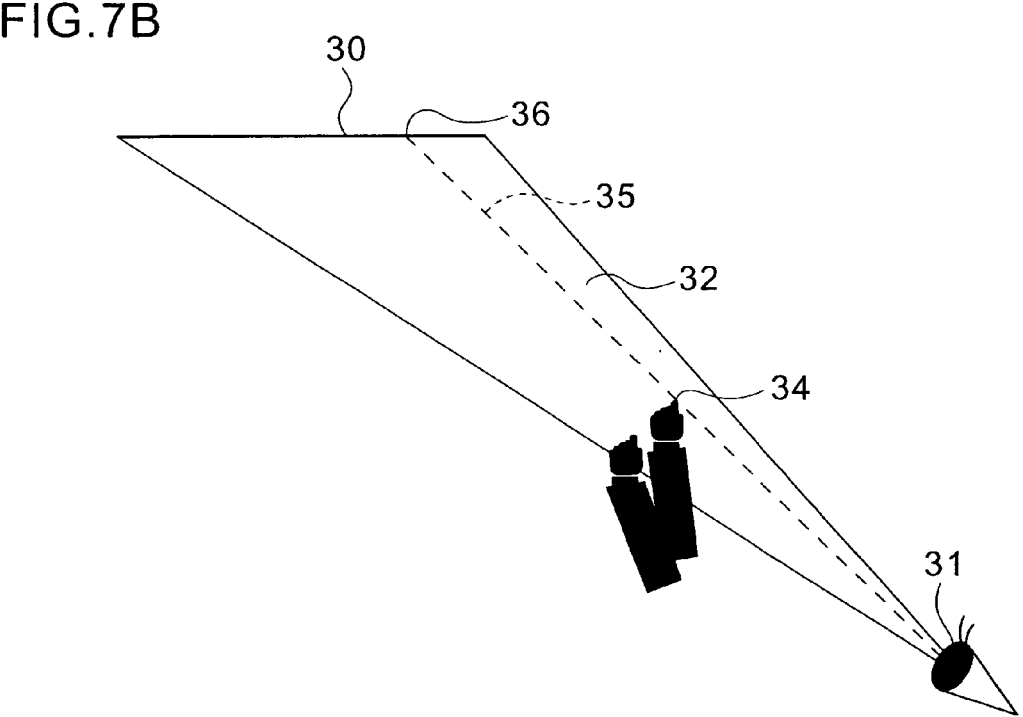

FIG. 7 is a conceptual drawing for explaining the pointing space 32 according to the second embodiment. As shown in FIG. 7, in the second embodiment, the predetermined reference point 31 is set to the position of the operator's eye detected by the second three-dimensional image sensor 1-2. In other words, the pointing space 32 according to the second embodiment is a space of pyramid shape defined by connecting the display screen 30 and the position 31 of the operator's eye.

Figure 8:
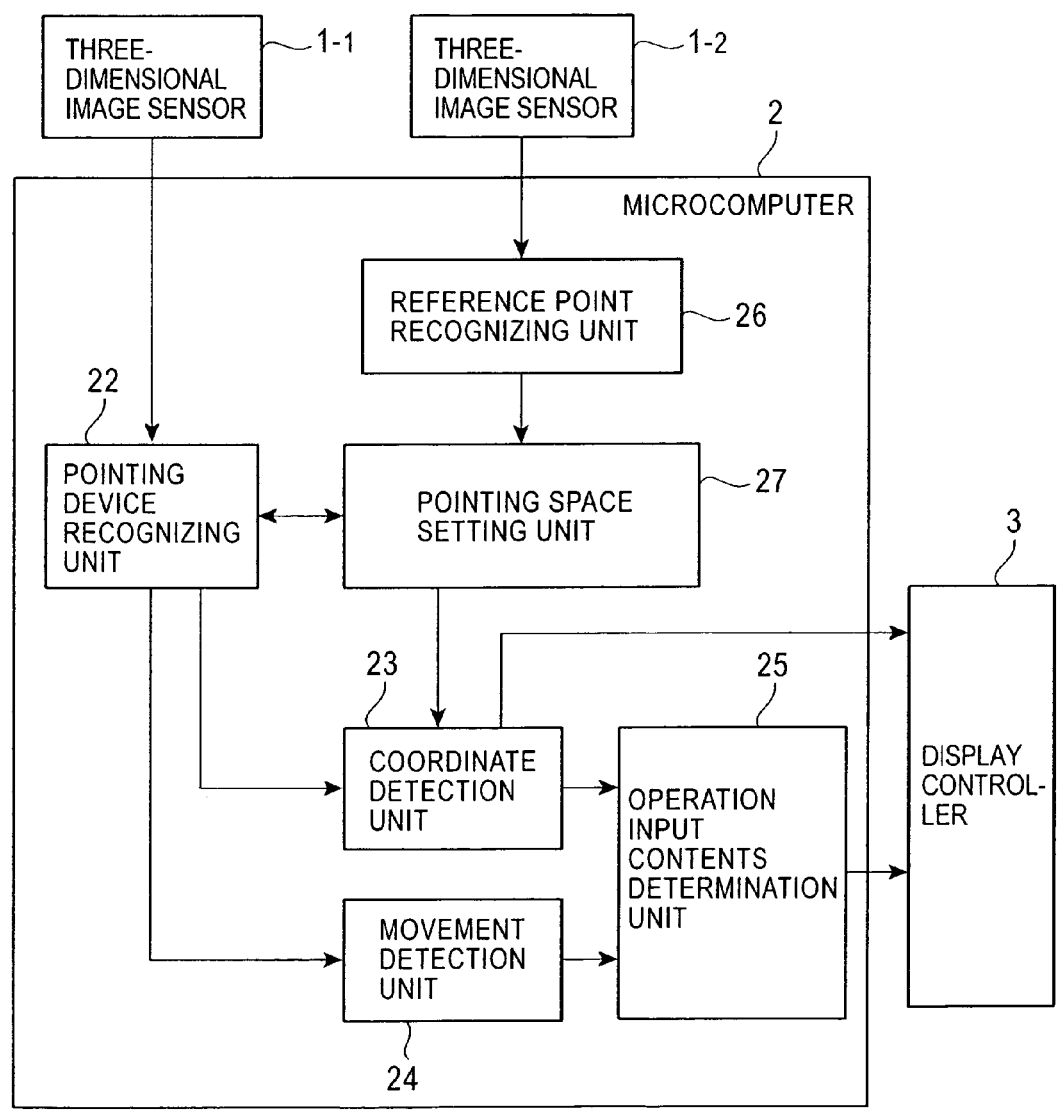
FIG. 8 is a block diagram showing an example of the functional structure of the microcomputer according to the second embodiment.

FIG. 8 is a block showing an example of the functional structure of the microcomputer 2 according to the second embodiment. In FIG. 8, the components represented by the same reference numerals have the same functions and redundant description is omitted. As shown in FIG. 8, in the second embodiment, a reference point recognizing unit 26 is provided as a functional structure of the microcomputer 2. A pointing space setting unit 27 having a different function from the pointing space setting unit 21 shown in FIG. 2 is also provided.

The reference point recognizing unit 26 recognizes the operator's eye which is to be the reference point 31 based on information supplied from the other three-dimensional image sensor 1-2. The pointing space setting unit 27 sets the pointing space 32 with the recognized position of the operator's eye as the reference point 31. Positional information on the display screen 30, which is another factor for defining the pointing space 32 is registered in the memory such as the RAM 2c in advance. In this embodiment, the pointing device recognizing unit 22 recognizes the pointing device 34 based on the positional information of the object within the pointing space 32 provided from the one three-dimensional image sensor 1-1.

As described above, in the case where the position of the operator's eye detected by the three-dimensional image sensor 1-2 is set as the reference point 31 of the pointing space 32, when the operator moves, the pointing space 32 moves according to the position of the moved eye. Accordingly, the troublesome operation of moving the pointing device 34 such as a finger to a fixed spatial plane as in the related art is not necessary irrespective of the movement of the operator with respect to the display screen 30, and usability may further be improved. Since the operator operates while anticipating the display screen 30, the disadvantage that erroneous operation input may occur can be minimized irrespective of the position of the operator with respect to the display screen 30.

Figure 9A:
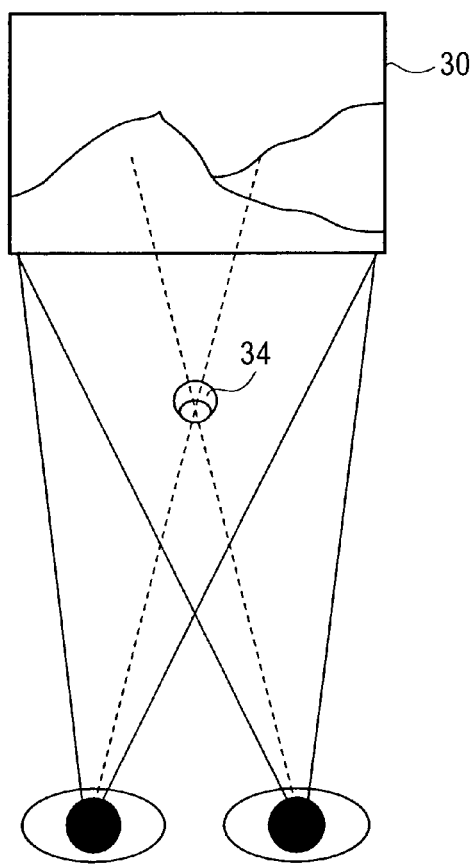
FIG. 9 is a conceptual drawing for describing a dominant eye.
Figure 9B:
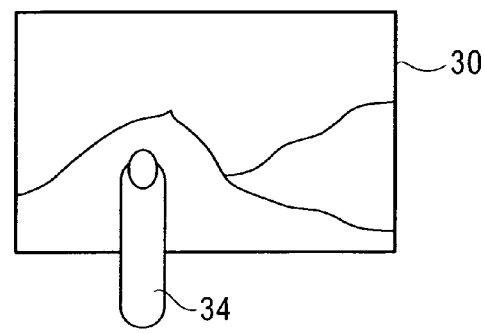
Figure 9C:
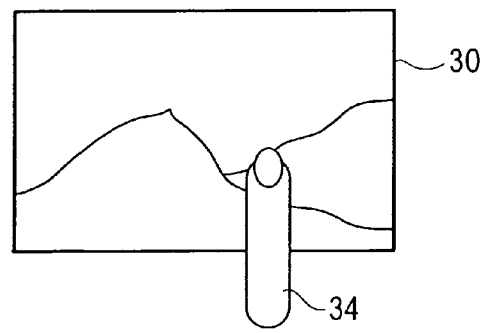

The position of the operator used as the reference point 31 is preferably the position of his/her dominate eye. As shown in FIG. 9A, when the operator looks at the display screen 30 with both eyes, the pointing device 34 located between the display screen 30 and the operator is seen double by the operator. This is because the position of the pointing device 34 looks different between the case where the operator looks at the display screen 30 and the pointing device through the right eye and the case where he/she looks through the left eye, as shown in FIGS. 9B and 9C.

In general, it is assumed that when the image is seen in double by the azimuth difference, the image which is seen by the dominant eye affects the determination. For example, when the operator's dominant eye is the right eye and he/she indicates a certain object with his/her finger with both eyes open, the finger point is not shifted from the object even though he/she closes his/her left eye, but the finger point is shifted from the object when he/she closes his/her right eye. Therefore, by employing a pyramid which is defined when the operator anticipates the display screen 30 by his/her dominant eye as the pyramid of the pointing space 32, even though the pointing device 34 is seen in double, the indicated objective point 36 corresponds to an intended position.

The dominant eye of the operator may be registered in advance in the RAM 2c of the microcomputer 2 or other memories, not shown, using, for example, the input device (not shown) such as the keyboard, mouse, or the joystick. In this case, the pointing device recognizing unit 22 recognizes the dominant eye based on information provided by the three-dimensional image sensor 1-2 according to the information on the dominant eye registered in advance. The pointing space setting unit 27 then sets the pointing space 32 with the dominant eye as the reference point 31.

Although the example in which the position of the eye of the operator is set as the reference point 31 has been described in the second embodiment, it is also possible to set the position of the operator's nose, mouth or the center of his/her face as the reference point 31.

Third Embodiment

Figure 10:
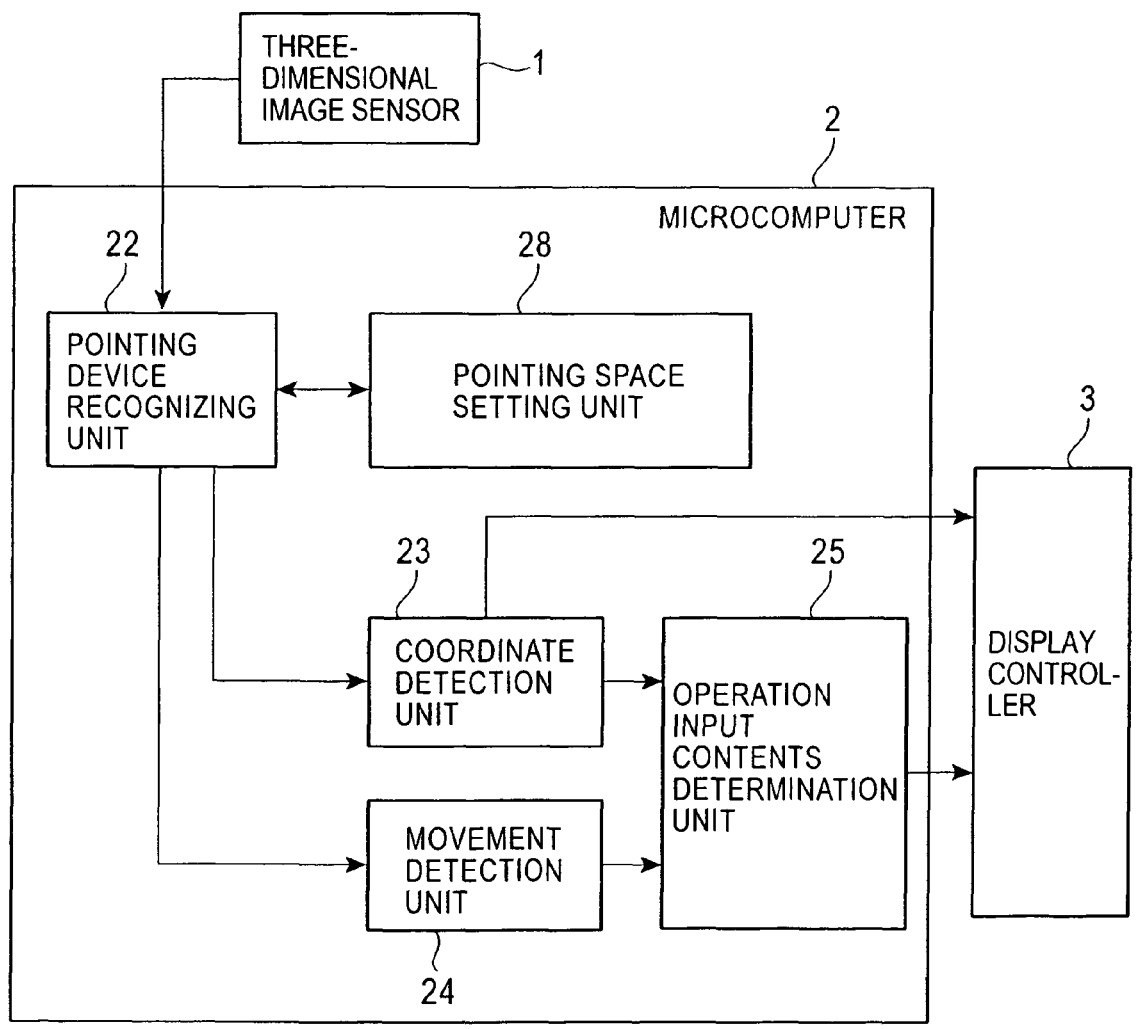
FIG. 10 is a block diagram showing a functional structure of a microcomputer according to a third embodiment.

A third embodiment of the present invention will now be described. In the third embodiment, the three-dimensional image sensor 1 is used as the position detection means as in the first embodiment. The functional structure of the microcomputer 2 in the third embodiment is shown in the block diagram in FIG. 10. In FIG. 10, the components represented by the same reference numerals as those shown in FIG. 2 have the same functions, and redundant description will be omitted.

Figure 11:
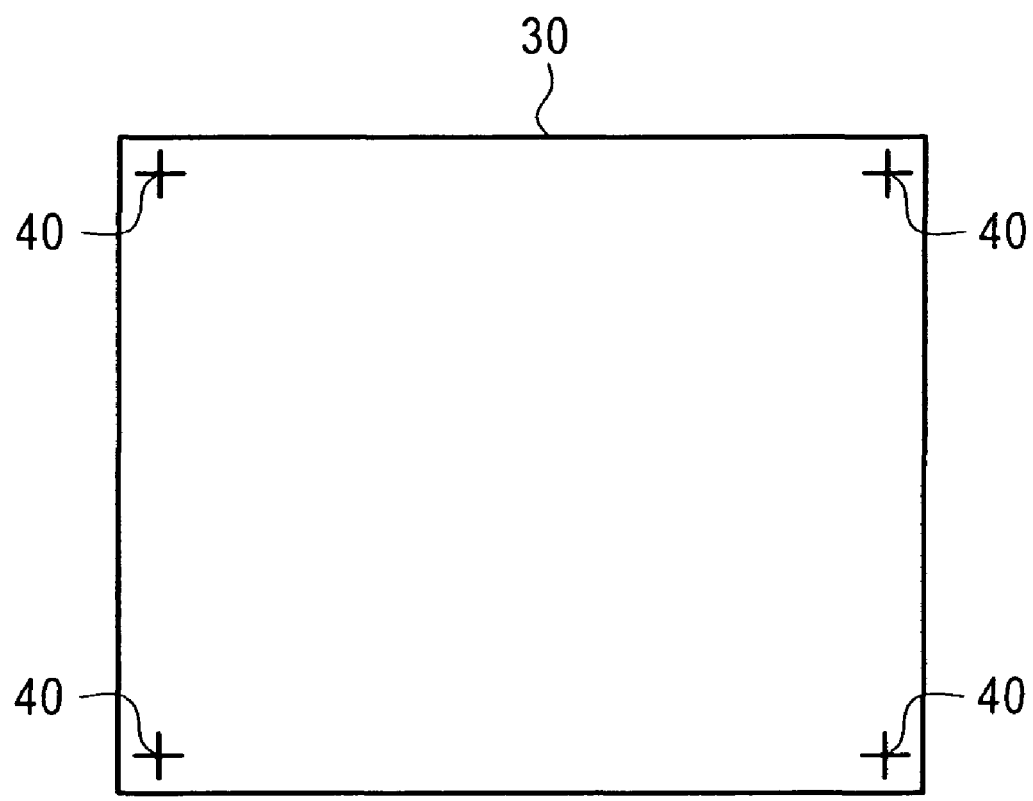
FIG. 11 is a drawing showing a screen for calibrating a reference point.

As shown in FIG. 10, in the third embodiment, a pointing space setting unit 28 having a different function than the pointing space setting unit 21 shown in FIG. 2 is provided as a functional structure of the microcomputer 2. The pointing space setting unit 28 sets the reference point 31 at a position which defines the pointing space 32 so as to allow the operator to operate the pointing device 34 in a natural manner. More specifically, the pointing space setting unit 28 issues an instruction to the display controller 3 to display a screen for calibrating the reference point 31 on the display screen 30 as shown in FIG. 11. Predetermined marks 40 are displayed at four corners of the calibration screen.

The operator performs the pointing action (for example, the pointing start action or click action) in space with respect to the marks 40 at the four corners. When the pointing action is performed by the operator with respect to the marks 40 at the four corners, the pointing space setting unit 28 detects the position of the pointing device 34 when the operator starts or finishes the pointing action respectively by the three-dimensional image sensor 1, and specifies a plane defined by connecting these four positions. The pointing space setting unit 28 assumes a pyramid containing both the surface of the display screen 30 (more specifically, a plane defined by connecting the marks 40 at the four corners on the display screen 30) and a plane defined by connecting the positions of the pointing device 34 when the operator performs the pointing action for the marks 40 at the four corners of the display screen 30 respectively as cross sections, and sets the position corresponding to the apex of the pyramid as the reference point 31. The pyramid defined by connecting the reference point 31 obtained as described above and the display screen 30 is set as the pointing space 32.

In the above-described second embodiment, it is necessary to always place the pointing device 34 such as a finger on a straight line 35 connecting the objective point 36 that the operator wants to operate on the display screen 30 and the reference point 31 which is assumed to be the position of the operator's eye for performing the pointing action. In contrast, according to the third embodiment, when the operator performs the pointing action for the four corners of the display screen 30 using the calibration screen as shown in FIG. 11, by performing the pointing action with the pointing device 34 placed at a position where the operator can operate most easily in a natural position, the pointing space 32 which always contains a plane defined by the four corners is set. Therefore, the pointing space 32 can be set to a position where the operator can easily execute the operation input according to the individual operators, whereby the usability of the human interface in the space can further be improved.

Since the pointing action for the marks 40 at the four corners is generally performed by using the dominant eye without consciousness, it is not necessary to register the dominant eye in advance using the input device as in the second embodiment, and hence the pointing action for the marks 40 at four corners is equivalent to automatic setting of the dominant eye.

Fourth Embodiment

A fourth embodiment of the present invention will now be described. The fourth embodiment is a combination of the second embodiment and the third embodiment described above. In other words, in the fourth embodiment, the movement of the pointing device 34 during calibration is detected using the first three-dimensional image sensor 1-1 through the same action as in the third embodiment, whereby the reference point 31 is obtained and is set as the initial value. Then, the movement of the operator's eye, nose, mouth or the center of the face is detected using the second three-dimensional image sensor 1-2 through the same movement as in the second embodiment, whereby the reference point 31 is moved from the initial value according to the detected movement.

In this arrangement, when the operator moves, the pointing space 32 moves with the position of the moved eye or the like. Accordingly, the operability of the operator does not change irrespective of the movement of the operator with respect to the display screen 30 as long as the movement of the pointing space 32 follows, and hence the usability can be improved. Since the operator operates the display screen 30 while always anticipating the display screen 30 irrespective of the movement of the operator with respect to the display screen 30, the disadvantage that an erroneous operation input may occur can be minimized.

Figure 12:
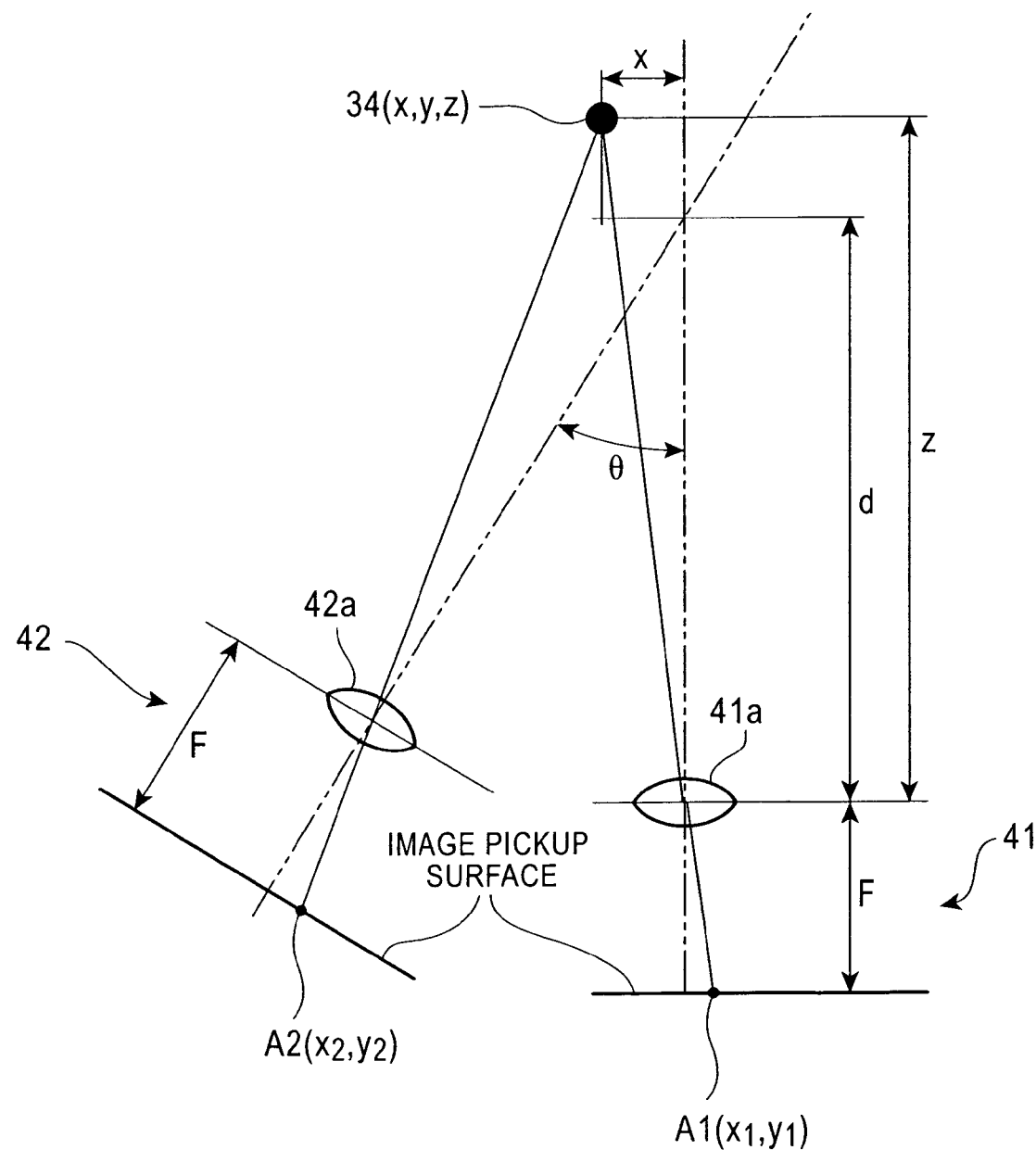
FIG. 12 is a drawing for explaining a method of detecting the position of an object in the case in which a stereo camera is used as a position detecting means.

Although examples in which the three-dimensional image sensor is used as the position detecting means in the first through fourth embodiments have been described above, the invention is not limited thereto. For example, it is also possible to use a stereo-camera. FIG. 12 is a drawing for describing a method of detecting the object when a stereo camera is used as the position detecting means.

As shown in FIG. 12, a primary camera 41 directed to the pointing space 32 where the pointing device 34 exists is installed, for example, on the right side of the display screen 30, and an auxiliary camera 42 directed toward the pointing space 32 where the pointing device 34 exists is installed, for example, on the left side of the display screen 30. These two cameras 41, 42 have the equivalent optical system, and are installed to cause the optical axes thereof to intersect at a distance d and an angle $\theta$.

Now, the position of an image-forming point A1 on the image pickup surface of the primary camera 41 where the image of the pointing device 34 is formed is assumed to be (x1, y1), and the position of an image-forming point A2 on the image pickup surface of the auxiliary camera 42 where the image of the pointing device 34 is formed is assumed to be (x2, y2). When the focal distance of lenses 41a, 42a of the respective cameras 41, 42 is represented by F, the three-dimensional position (x, y, z) of the pointing device 34 viewed from the display screen 30 can be obtained from the following expressions.

$x = d \cdot x1 \cdot G(x2)/H(x1,x2)$ $y = d \cdot y1 \cdot G(y2)/H(y1,y2)$ $z = d \cdot F \cdot G(x1)/H(x1,x2)$ where:

$G(x1) = F \cdot \sin\theta \cdot x1(1-\cos\theta)$ $H(x1,x2) = (F+x1 \cdot x2)\sin\theta + F(x1-x2)\cos\theta$ Although the example in which the reference point 31 of the pointing space 32 is provided at one position has been described in the first through fourth embodiments described above, it is also possible to set a plurality of pointing spaces 32 by setting a plurality of reference points 31. It is also possible to switch the position of the reference point 31 depending on the position of the operator. For example, when the operation input device of the first embodiment is applied to a vehicle-mounted navigation system, it can be adapted to be capable of changing the reference point 31 to any one of predetermined positions provided near a driver's seat, a passenger's seat or a rear seat. Alternatively, when the operation input device of the second embodiment is applied to a vehicle-mounted navigation system, it can be adapted to be capable of changing the reference point 31 to any one of the positions of an operator sitting in the driver's seat, the passenger's seat or the rear seat. When the operation input device of the third embodiment is applied to a vehicle-mounted navigation system, it can be adapted to be capable of changing the reference point 31 to any one of the positions set by the eye of an operator sitting in the driver's seat, the passenger's seat, or the rear seat through calibration. The fourth embodiment can be adapted to be capable of changing the reference point 31 by the combination of the above-described second and third embodiments.

Although the three-dimensional image sensor 1-1 for detecting the pointing device 34 and the three-dimensional image sensor 1-2 for detecting the reference point 31 are employed in the above-described second and fourth embodiment, it is also possible to employ one single three-dimensional image sensor which can cover both the area where the pointing device 34 exists and the area where the reference point 31 exists to perform the same operation.

Figure 13A:
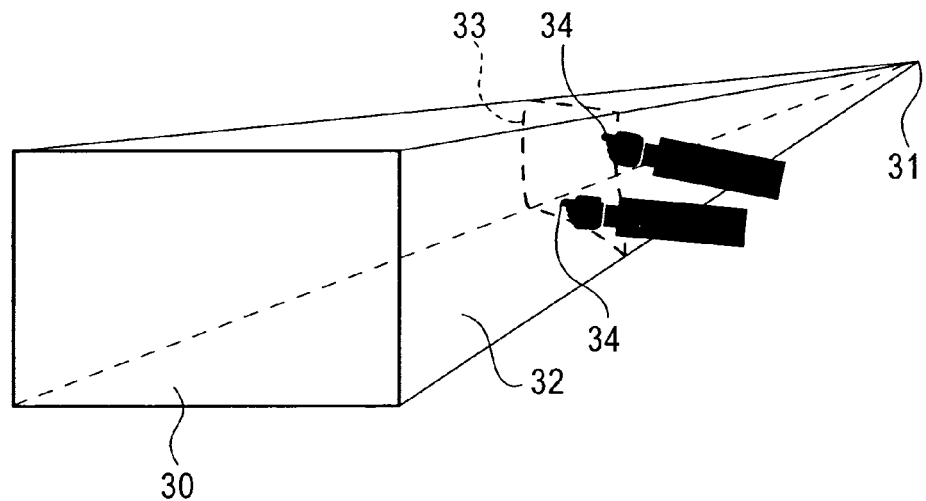
FIG. 13 is a conceptual drawing for explaining the pointing space and a pointing plane according to a modification of the first embodiment.
Figure 13B:
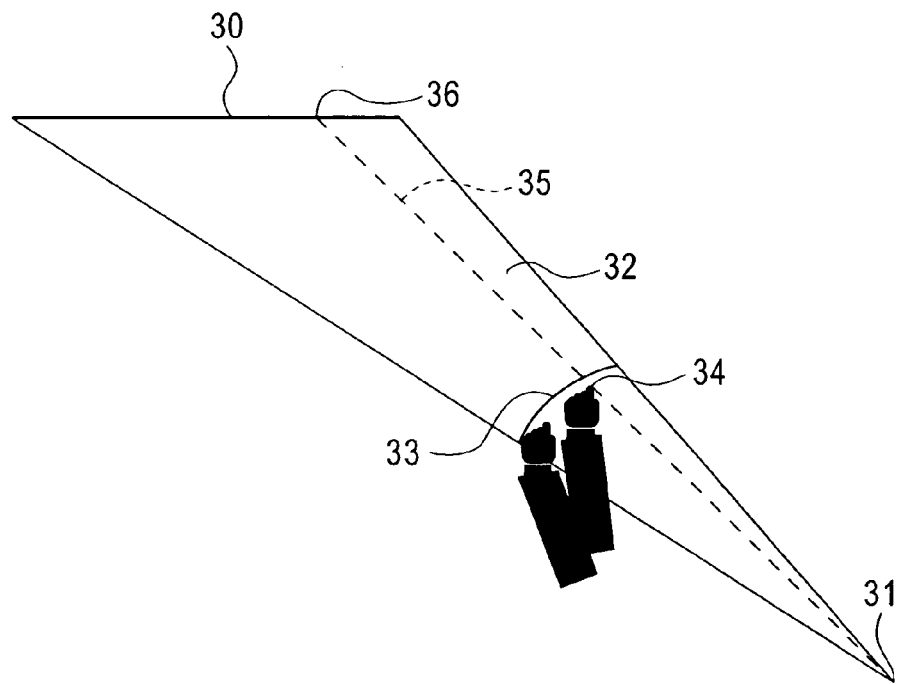
Figure 14A:
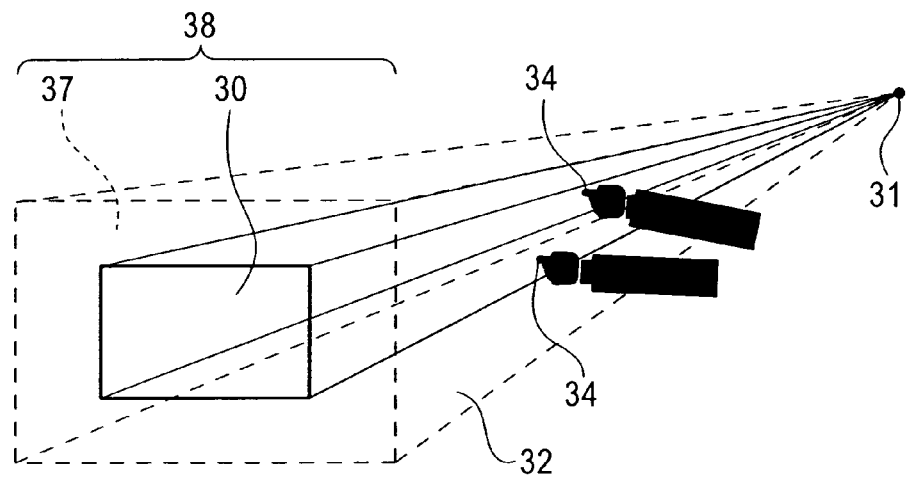
FIG. 14 is a conceptual drawing for explaining an extended pointing space in the first embodiment.
Figure 14B:
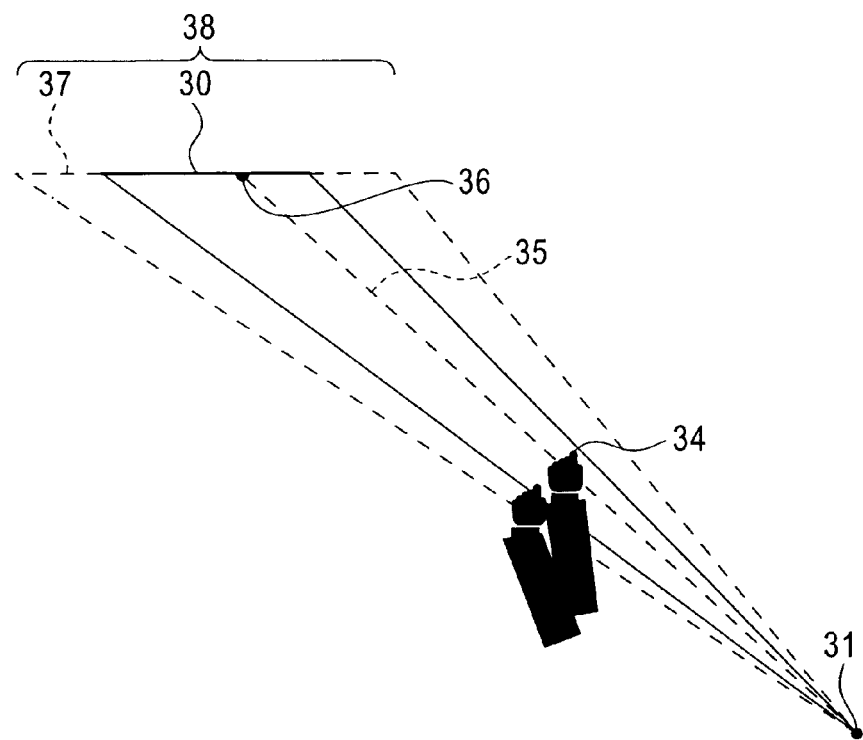

Although the pointing space setting units 21, 27, 28 set the pointing space 32 in the first through fourth embodiments, it is also possible to adapt the same to further set a pointing plane in the pointing space 32. FIG. 13 is a conceptual drawing for explaining the pointing space 32 and a pointing plane 33 in such a case.

Describing the case of the first embodiment as an example, the pointing space setting unit 21 sets a virtual pointing space 32 of a pyramid shape defined by connecting the display screen 30 and the reference point 31 located at a position spaced apart from the display screen 30 and sets a spatial plane obtained by mapping the coordinates of the display screen 30 in the pointing space 32 as the pointing plane 33.

The pointing plane 33 is always set between the display screen 30 and the operator (positioned in front of the reference point 31). The pointing plane 33 includes a position where the distal end (e.g., finger tip) of the pointing device 34 exists when the operator performs the pointing action (pointing start operation, pointing release operation, click operation and drag operation) using the pointing device 34, and is a flat plane or a curved plane along which the track of the pointing device 34 is assumed to follow when the operator moves the pointing device 34 in a natural manner.

As described above, in the first embodiment, since the position of the display screen 30 and the position of the reference point 31 are known in advance, the pointing space 32 is uniquely determined. In contrast, the pointing plane 33 is dynamically set according to the movement of the pointing device 34 in the pointing space 32. In other words, the pointing space setting unit 21 dynamically sets the pointing plane 33 as described above every time when the pointing action is performed.

(Extension of the Pointing Space)

In the first through fourth embodiments, the pointing space setting unit 21 is adapted to set the virtual pointing space 32 of pyramid shape defined by connecting the display screen 30 and the predetermined reference point 31 which is located at a position spaced apart from the display screen 30. However, the pointing space setting unit 21 can also assume an extended plane 37 of a certain size outside the display screen 30 and define a deployed plane 38 by combining the display screen 30 and the extended plane 37. Then, the virtual pointing space 32 of the pyramid shape defined by the deployed plane 38 and the reference point 31, which is located at a position spaced apart from the deployed plane 38, is set.

In this case, in the description of the pointing space 32 in the above-described embodiment, the display screen 30 is replaced by the deployed plane 38.

When the pointing space is applied to the first embodiment, based on the coordinate information of the objective point 36 supplied by the coordinate detection unit 23, if the coordinate information is not on the extended plane 37 but is on the display screen 30, the display controller 3 displays the predetermined mark (for example, the arrow mark) at the coordinate position of the objective point 36 on the display screen 30 as needed.

When the coordinate information is on the extended plane 37, it is also possible to display a predetermined mark (for example, an arrow directed toward the objective point 36) at a point where the line connecting the center portion of the display screen 30 and the objective point 36 represented by the coordinate information intersects the end portion of the display screen 30.

The operation input contents determination unit 25 supplies information on the contents of the detected operation input to the display controller 3. For example, when the operation input contents determination unit 25 determines that the click action is performed toward the object (for example, the operation button by Graphical User Interface) existing at the coordinate position of the objective point 36, it supplies the operation instruction for performing the process assigned to the operating button. When the operation input contents determination unit 25 determines that the drag action is performed for the object (an icon, for example) existing at the coordinate position of the objective point 36, it supplies the operation instruction for moving the object in the dragged direction by the dragged amount to the display controller 3.

When the operation input device in this embodiment is applied to a navigation system, it is also possible to adapt the operation input device to supply the operation instruction to the display controller 3 for scrolling the entire map to move the point indicated by the pointing start action in the dragged direction by the dragged amount.

Alternatively, when the operation input device of this embodiment is applied to a navigation system, when the operation input contents determination unit 25 determines that the drag action is performed, the operation input device controls the display in such a manner that the entire map is scrolled to move the point at the coordinate position of the objective point 36 on the deployed plane 38 detected by the coordinate detection unit 23 (the point which is assumed to be on the extended plane 37 when the coordinate position on the extended plane 37 is indicated) in the dragged direction by the dragged amount.

FIG. 15 is a drawing showing an example of the action when the drag operation is performed. FIG. 15 shows an example of the action when the operation input device of this embodiment is applied to a navigation system, and the display screen 30 and part of the extended plane 37 are shown. As shown in FIG. 15, according to the present embodiment, by indicating the point assumed to be outside the display screen 30 by the pointing device 34 (FIG. 15A), and performing the drag action (FIG. 15B), the screen is scrolled so that the point outside the display screen 30 is displayed in the display screen 30.

Although the case in which a point outside the screen is scrolled into the screen has been described in FIG. 15, the invention is not limited thereto, and it is also possible to adapt it in such a manner that a point outside the screen is automatically scrolled into a predetermined position in the screen by clicking that point outside the screen. The predetermined position in the screen may be, for example, the center of the screen, the current position of the vehicle (the position where the vehicle position mark is displayed), or the position where the cursor is displayed.

Figure 16:
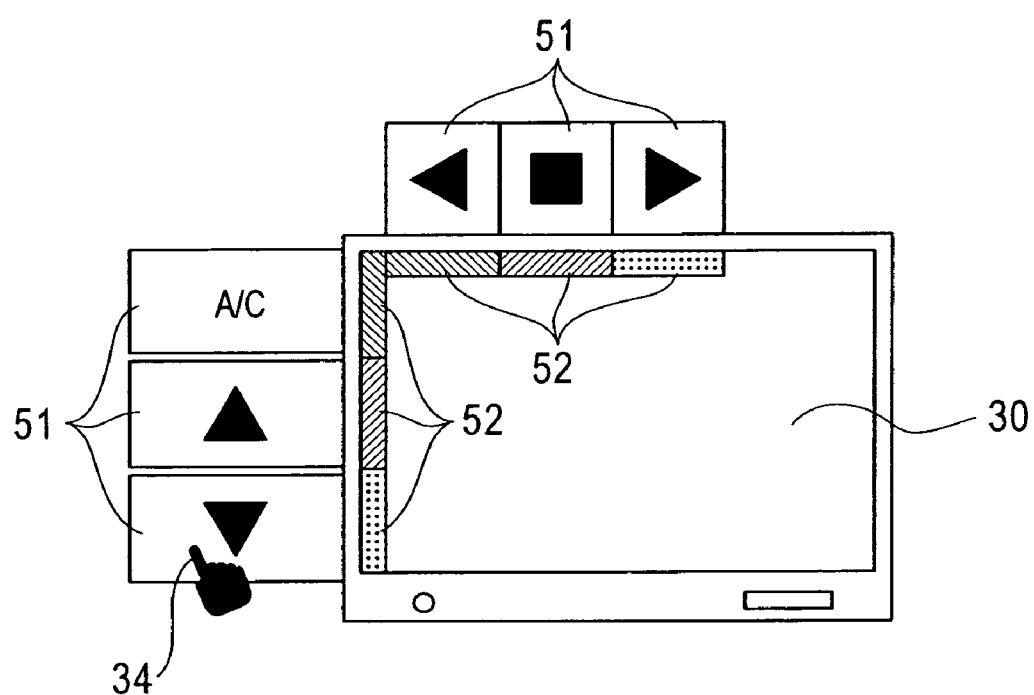
FIG. 16 is a drawing showing an example of an action when the click operation is performed.
Figure 17A:
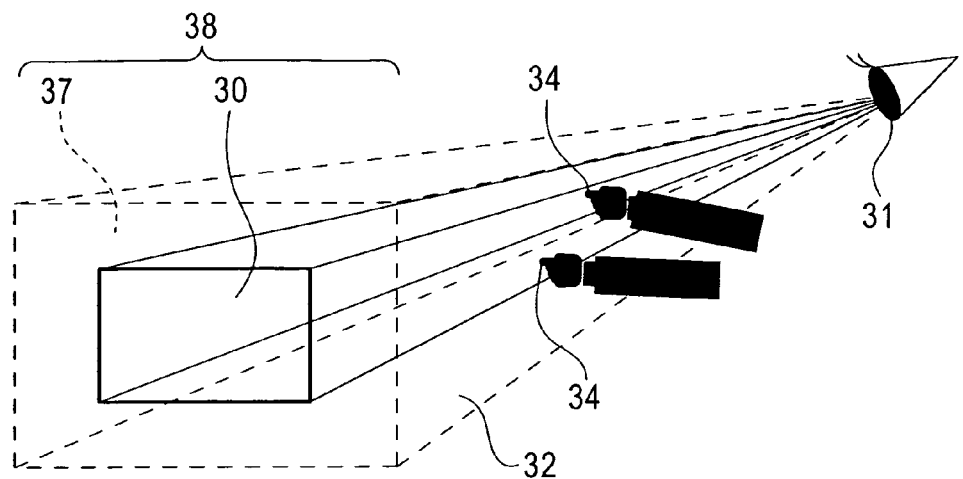
FIG. 17 is a conceptual drawing for explaining an extended pointing space according to the second embodiment.
Figure 17B:
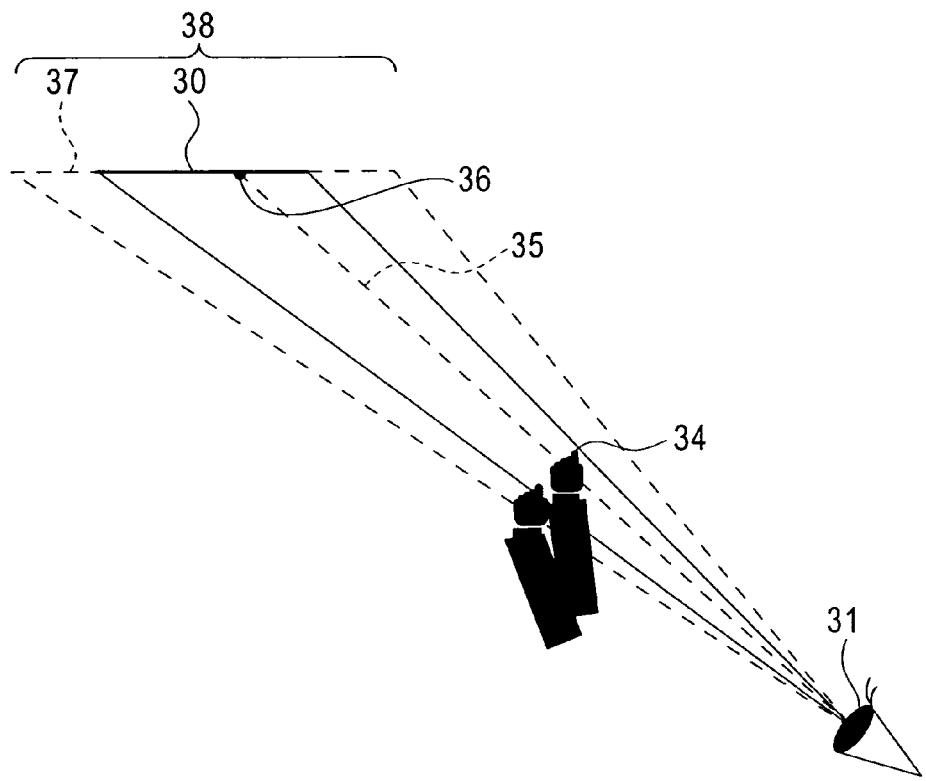
Figure 18A:
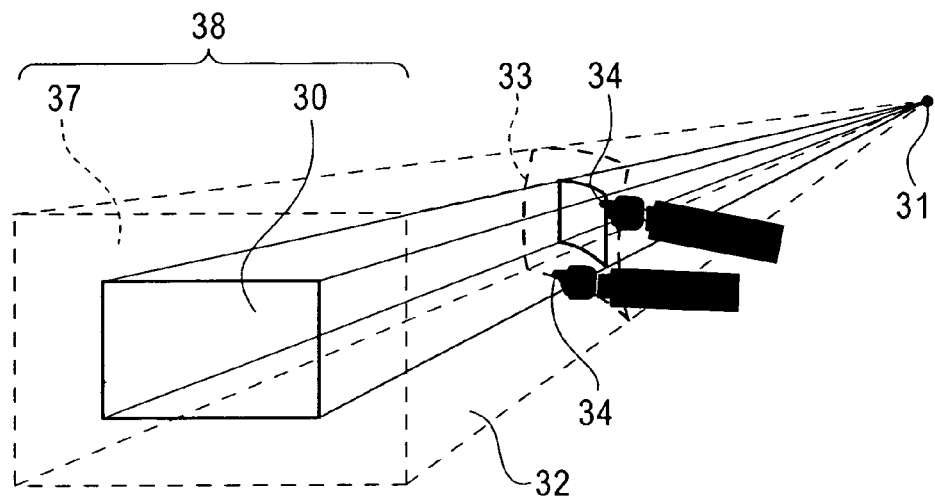
FIG. 18 is a conceptual drawing for explaining an extended pointing space and pointing plane according to a modification of the first embodiment.
Figure 18B:
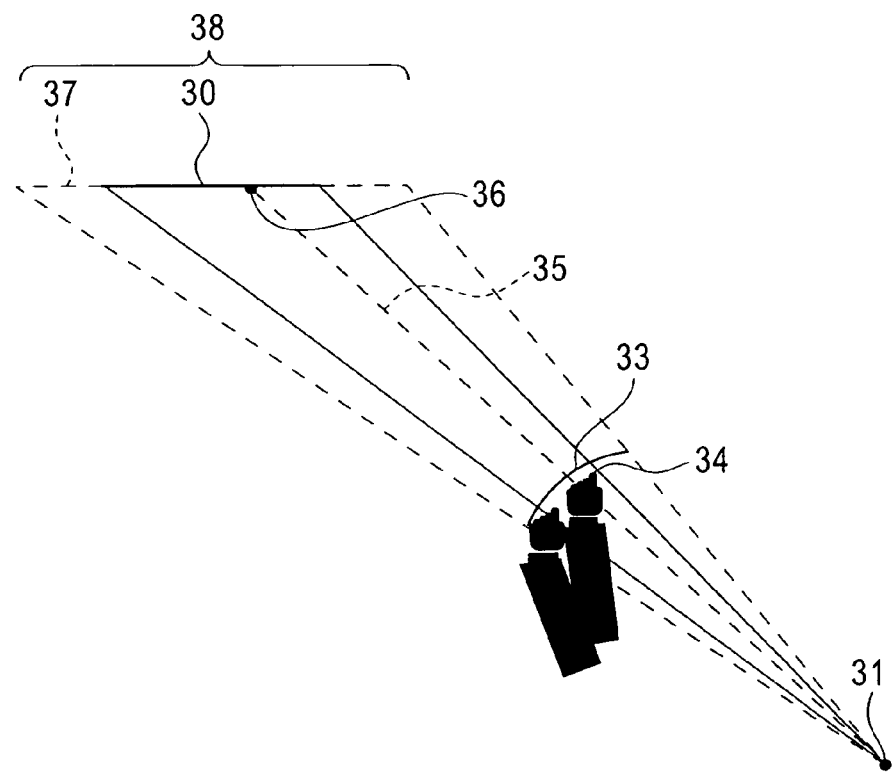

FIG. 16 is a drawing showing an example of the action when the click operation is performed. In the example shown in FIG. 16, the pointing space setting unit 21 divides part of the extended plane 37 into a plurality of areas, and sets these areas as the pointing areas 51. Virtual operating buttons for executing the predetermined process are assigned to the respective pointing areas 51. Band shaped operation accepting areas 52 corresponding to the positions where the pointing areas 51 exist are displayed along the outer peripheral portion of the display screen 30 in order to notify the operator of the fact that the pointing area 51 exists on the extended plane.

In this case, the operator instructs the execution of the command by performing the clicking action with respect to the pointing area 51 located on the extended plane 37 outside the display screen 30. In this case, the operation input contents determination unit 25 determines which pointing area 51 on the extended plane 37 is clicked, and generates the command execution instruction corresponding to the clicked pointing area 51. In this arrangement, the pointing areas 51 are not reduced in size while securing the surface area for displaying the main contents information on the display screen 30 (the surface area of the area other than the operation accepting areas 52), so that the operation input is facilitated.

Although an example in which part of the extended plane 37 is divided into the plurality of pointing areas 51 is shown in FIG. 16, it is also possible to divide the entire extended plane 37 into a plurality of the pointing areas 51. It is also possible to provide only one pointing area 51 on part of or the entire extended plane 37. Alternatively, it is also possible to cause the corresponding operation accepting area 52 to be popped up in the display screen 30.

As described thus far in detail, according to this embodiment, the pointing action is enabled not only for inside the display screen 30, but also for the extended plane 37 assumed outside the display screen 30, and hence the click action or the drag action can be performed for a point or an object which is assumed to be outside the display screen 30.

Accordingly, as shown in FIG. 15, by pointing and then dragging or clicking the point which is assumed to be outside the display screen 30, the desired point can be moved easily into the screen by scrolling without repeating the operation many times until the point assumed to be outside the screen comes into the screen.

As shown in FIG. 16, by dividing part of or the entire extended plane 37 into one or more areas, setting the respective areas as the pointing areas 51, and assigning the execution of commands to the respective pointing areas 51, most of the inside the display screen 30 can be used for displaying the main contents information, and the extended plane 37 assumed to be outside the display screen 30 can be used as pointing areas 51 for execution of commands. Accordingly, the operation input is facilitated without reducing the pointing area 51, while securing a sufficient surface area for displaying the main contents information.

Although the example in which the pointing space 32 defined by connecting the deployed plane 38 and the reference point 31 is set so that the pointing action is performed within the pointing space 32 has been described in conjunction with the first through fourth embodiments, the invention is not limited thereto. For example, it is also possible to adapt the invention in such a manner that the pointing action is performed on the deployed plane 38.

The above-described embodiments are shown simply as examples for implementing the invention, and it should be understood that the technical scope of the invention is not limited thereby. In other words, the invention may be modified in various forms without departing from the principal characteristics thereof.

The invention is useful as an operation input device for issuing input instructions to a computer system or a navigation system through the operation of the operator.

What is claimed is:

1. An operation input device comprising:
    position detection means for detecting the three-dimensional position of an object in a space;
    pointing device recognizing means for recognizing whether an object in the pointing space, which is detected by the position detection means, is a predetermined pointing device;
    pointing space setting means for setting a virtual pointing space of a shape defined by connecting an area of a display screen as a base of the pointing space and a predetermined reference point which is located at a position spaced apart from the display screen as an apex of the pointing space;
    coordinate detection means for detecting a coordinate position of an objective point on the display screen using a mapping relation based on the position in the pointing space of the object which is recognized as the pointing device by the pointing device recognizing means;
    movement detection means for detecting the three-dimensional movement in the pointing space of the object which is recognized as the pointing device by the pointing device recognizing means; and
    determination means for determining the contents of the operation input based on the coordinate position of the objective point on the display screen, which is detected by the coordinate detection means, and the three-dimensional movement of the object detected by the movement detection means and generating a corresponding operation instruction;
    wherein when the pointing device moves toward the display screen at a speed faster than a predetermined speed within a range of a predetermined coordinate position of the display screen in the pointing space, the determination means determines that a pointing start action is performed.

2. The operation input device according to claim 1, wherein when the pointing device moves away from the display screen at a speed faster than a predetermined speed within a predetermined coordinate position of the display screen in the pointing space, the determination means determines that a pointing release action is performed.

3. The operation input device according to claim 1, wherein when the pointing device moves toward the display screen at a speed faster than a predetermined speed within a predetermined coordinate position of the display screen, and then within a predetermined time period the pointing device moves away from the display screen at a speed faster than a predetermined speed within a predetermined coordinate position of the display screen in the pointing space, the determination means determines that a click action is performed.

4. The operation input device according to claim 1, wherein, when the pointing device moves toward the display screen at a speed faster than a predetermined speed within a predetermined coordinate position of the display screen and then moves so as to move the coordinate position of the display screen, which is detected by the coordinate detection means, the determination means determines that a drag action is performed.

5. The operation input device according to claim 4, comprising display control means for controlling a display in such a manner that when the determination means determines that the drag action is performed, the object located at the coordinate position of the objective point on the display screen, which is detected by the coordinate detection means, is moved in a dragged direction by a dragged amount.

6. The operation input device according to claim 1, wherein the reference point is a position of the operator's eye, which is detected by the position detection means.

7. The operation input device according to claim 1, wherein the reference point is a position of the operator's dominant eye, which is detected by the position detection means.

8. The operation input device according to claim 1, wherein the reference point corresponds to an apex of a pyramid containing both of the display screen and a plane obtained by connecting the positions of the pointing device when pointing at the corners of the display screen in a space as cross-sections.

9. The operation input device according to claim 1, wherein the pointing space setting means sets the position corresponding to the apex of a pyramid containing both of the display screen and a plane obtained by connecting the positions of the pointing device when pointing at the corners of the display screen in a space as cross-sections as an initial value, and causes the reference point to move from the initial value according to the three-dimensional movement of the operator's eye, which is detected by the movement detection means, based on the position of the operator's eye, which is detected by the position detection means.

10. The operation input device according to claim 1, wherein the pointing device recognizing means recognizes a rod-shaped projecting object as the pointing device.

11. The operation input device according to claim 1, comprising a display control means for displaying a predetermined mark at the coordinate position of the objective point on the display screen, which is detected by the coordinate detection means.

12. An operation input device comprising:
 position detection means for detecting the three-dimensional position of an object in a space;
 pointing space setting means for setting a virtual pointing space of a shape defined by connecting an area of a display screen as a base of the pointing space and a predetermined reference point located at a position spaced apart from the display screen as an apex of the pointing space, and setting a pointing plane obtained by mapping the coordinate position of the display screen at a position in the pointing space where the object exists;
 coordinate detection means for detecting the coordinate position of the objective point on the display screen using a mapping relation based on the position of the object on the pointing plane, which is detected by the position detection means;
 movement detection means for detecting the three-dimensional movement of the object in the pointing space; and
 determination means for determining the contents of the operation input based on the coordinate position of the objective point on the display screen, which is detected by the coordinate detection means, and the three-dimensional movement of the object detected by the movement detection means and generating a corresponding operation instruction;

wherein the pointing plane is located between the display screen and the operator, includes the position of the pointing device when the operator performs the pointing action, and is a plane defined by the pointing device when the operator moves the pointing device in a natural manner, and the pointing space setting means sets the pointing plane every time when the pointing action is performed.

13. A method of operation input comprising:
 detecting the three-dimensional position of an object in a virtual pointing space of a shape defined by connecting an area of a display screen as a base of the pointing space and a predetermined reference point located at a position spaced apart from the display screen as an apex of the pointing space wherein the reference point is a detected position of an operator's eye;
 detecting the three-dimensional movement of the object in the pointing space and calculating the coordinate position of the objective point on the display screen using a mapping relation based on the position of the detected object; and
 determining the contents of the operation input based on the three-dimensional movement of the object and the coordinate position of the objective point on the display screen corresponding to the position of the object, and generating a corresponding operation instruction;
wherein the method further comprises:
 displaying predetermined marks at four corners of the display screen to prompt the operator to perform the pointing action, and setting the pointing space by setting a position corresponding to an apex of a pyramid containing as cross-sections both of a plane defined by connecting the positions of the pointing device when the operator performs the pointing action for the respective predetermined marks in the space and the display screen as the initial value of the reference point;
 detecting the position of the operator's eye in the space and detecting the three-dimensional movement of the operator; and
 moving the reference point from the initial value according to the three-dimensional movement of the operator's eye and resetting the pyramid defined by the moved reference point and the display screen as the pointing space.

14. The method of operation input according to claim 13, comprising:
 recognizing that the detected object in the pointing space is a predetermined pointing device, and
 calculating the coordinate position of the objective point on the display screen based on the position of the detected object which is recognized as a predetermined pointing device.

15. An operation input device comprising:
 pointing space setting means for setting a virtual pointing space of a shape defined by connecting, as a base of the pointing space, an area of a deployed plane including a display screen and a coplanar, extended plane outside the display screen and, as an apex of the pointing space, a predetermined reference point located at a position spaced apart from the deployed plane where an operator is expected to be located; and
 pointing action detection means for detecting a pointing action performed in the pointing space and generating a corresponding operation instruction;
wherein the pointing space setting means divides at least part of the extended plane into one or more areas and sets the respective areas as pointing areas, and the pointing action detection means generates a command execution instruction corresponding to the pointing area pointed to by the pointing action wherein the pointing action detection means comprises:

position detection means for detecting the three-dimensional position of an object in the pointing space;

pointing device recognizing means for recognizing whether the object in the pointing space, which is detected by the position detection means, is a predetermined pointing device;

coordinate detection means for detecting the coordinate position of an objective point on the deployed plane using a mapping relation based on the detected position of the object in the pointing space, where the coordinate detection means detects the coordinate position of the objective point on the deployed plane based on the position of the object recognized as the pointing device by the pointing device recognizing means in the pointing space;

movement detection means for detecting the three-dimensional movement of the object in the pointing space, where the movement detection means detects the three-dimensional movement of the object recognized as the pointing device by the pointing device recognizing means; and determination means for determining the contents of the operation input based on the detected coordinate position of the objective point on the deployed plane and the detected three-dimensional movement of the object and generating a corresponding operation instruction; and wherein the pointing space setting means sets a position corresponding to an apex of a pyramid containing both of the deployed plane and the plane obtained by connecting the positions of the pointing device when pointing to the corners of the display screen in a space as cross-sections as an initial value, and causes the reference point to move from the initial value according to the three-dimensional movement of the operator's eye, which is detected by the movement detection means.

16. The operation input device according to claim 15, comprising display control means for scrolling the screen to move a point pointed to by the pointing action in a dragged direction by a dragged amount when the pointing action detection means detects that a drag action is performed.

17. The operation input device according to claim 15, comprising display control means for scrolling the screen to move a point pointed to by the pointing action to a predetermined position in the display screen when the pointing action detection means detects that a click action is performed.

18. An operation input device comprising:

position detection means for detecting the three-dimensional position of an object in a space;

pointing device recognizing means for recognizing whether an object in the space, which is detected by the position detection means, is a predetermined pointing device;

pointing space setting means for setting a virtual pointing space of a pyramid shape defined by connecting a deployed plane including a display screen and a coplanar, extended plane outside the display screen as a base of the pointing space and a predetermined reference point located at a position spaced apart from the deployed plane where an operator is expected to be located as an apex of the pointing space;

coordinate detection means for detecting a coordinate position of an objective point on the deployed plane using a mapping relation based on the position in the pointing space of the object which is recognized as the pointing device by the pointing device recognizing means;

movement detection means for detecting the three-dimensional movement in the pointing space of the object which is recognized as the pointing device by the pointing device recognizing means;

pointing plane setting means for setting as a pointing plane a spatial plane obtained by mapping the coordinates of the deployed plane to a position in the pointing space that is spaced apart from the deployed plane where the object exists;

pointing action detection means for detecting a pointing action performed on the pointing plane and generating a corresponding operation instruction; and determination means for determining the contents of the operation input based on the coordinate position of the objective point on the deployed plane, which is detected by the coordinate detection means, and the three-dimensional movement of the object detected by the movement detection means;

wherein when the pointing device moves toward the display screen at a speed faster than a predetermined speed within a range of a predetermined coordinate position of the deployed plane in the pointing space, the determination means determines that a pointing start action is performed.

19. The operation input device according to claim 18, wherein the pointing plane is located between the deployed plane and the operator, includes the position of a pointing device when the operator performs the pointing action, and is a plane along which the track of the pointing device may follow when the operator moves the pointing device in a natural manner, and the pointing plane setting means sets the pointing plane every time the pointing action is performed.

20. A method of operation input comprising:

setting a virtual pointing space of a shape defined by connecting, as a base of the pointing space, an area of a deployed plane including a display screen and a coplanar, extended plane outside the display screen and, as an apex of the pointing space, a predetermined reference point located at a position spaced apart from the deployed plane where an operator is expected to be located; and detecting a pointing action performed in the pointing space and generating a corresponding operating instruction;

wherein the setting act divides at least part of the extended plane into one or more areas and sets the respective areas as pointing areas, and the detecting act generates a command execution instruction corresponding to the pointing area pointed to by the pointing action;

wherein the detecting act comprises:

detecting the three-dimensional position of an object in the pointing space;

recognizing whether the object detected in the pointing space is a predetermined pointing device;

detecting the coordinate position of an objective point on the deployed plane using a mapping relation based on the detected position of the object recognized as the pointing device in the pointing space;

detecting the three-dimensional movement of the object recognized as the pointing device in the pointing space; and determining the contents of the operation input based on the detected coordinate position of the objective point on the deployed plane and the detected three-dimensional movement of the object and generating a corresponding operation instruction; and wherein the setting act sets a position corresponding to an apex of a pyramid containing both of the deployed plane and the plane obtained by connecting the positions of the pointing device when pointing to the corners of the deployed plane in a space as cross-sections as an initial value, and causes the reference point to move from the initial value according to the detected three-dimensional movement of the operator's eye.

21. The method of operation input according to claim 20, further comprising:

detecting the three-dimensional position of an object located in the pointing space;

detecting the three-dimensional movement of the object in the pointing space and calculating the coordinate position of an objective point on the deployed plane using a mapping relation based on the position of the object in the pointing space; and determining the contents of the operation input based on the three-dimensional movement of the object and the coordinate position of the objective point on the deployed surface corresponding to the position of the object, and generating a corresponding operating instruction.

22. A method of operation input comprising:

detecting the three-dimensional position of an object in a space;

setting a virtual pointing space of a shape defined by connecting a deployed plane including a display screen and a coplanar, extended plane outside the display screen as a base of the pointing space and a predetermined reference point located at a position spaced apart from the deployed plane where an operator is expected to be located as an apex of the pointing space, detecting the coordinate position of an objective point on the deployed plane using a mapping relation based on the detected position of the object in the pointing space;

detecting the three-dimensional movement of the object in the pointing space;

setting as a pointing plane a spatial plane obtained by mapping the coordinates of the deployed plane to a position in the pointing space that is spaced apart from the deployed plane where the object exists;

detecting a pointing action performed on the pointing plane and generating a corresponding operation instruction; and determining the contents of the operation input based on the detected coordinate position of the objective point on the deployed plane and the detected three-dimensional movement of the object;

wherein the pointing plane is located between the deployed plane and the operator, includes the position of the object when the operator performs the pointing action, and is a plane defined by the object when the operator moves the object in a natural manner, and the pointing plane setting act sets the pointing plane every time when the pointing action is performed.

* * * * *